United States Patent
Dukellis et al.

(10) Patent No.: US 8,860,865 B2
(45) Date of Patent: Oct. 14, 2014

(54) ASSISTED VIDEO CREATION UTILIZING A CAMERA

(75) Inventors: John Nicholas Dukellis, San Francisco, CA (US); Kaz Hashimoto, Jackson Hole, CA (US)

(73) Assignee: Burning Moon, LLC, Wilson, WY (US)

( * ) Notice: Subject to any disclaimer, the term of this patent is extended or adjusted under 35 U.S.C. 154(b) by 1039 days.

(21) Appl. No.: 12/715,367

(22) Filed: Mar. 1, 2010

(65) Prior Publication Data
US 2010/0220197 A1    Sep. 2, 2010

Related U.S. Application Data

(60) Provisional application No. 61/156,871, filed on Mar. 2, 2009.

(51) Int. Cl.
| | |
|---|---|
| H04N 5/222 | (2006.01) |
| H04N 5/93 | (2006.01) |
| G06Q 30/06 | (2012.01) |
| H04N 5/262 | (2006.01) |
| G11B 27/28 | (2006.01) |
| G06Q 30/02 | (2012.01) |
| H04N 5/232 | (2006.01) |
| G11B 27/034 | (2006.01) |
| G06Q 50/18 | (2012.01) |

(52) U.S. Cl.
CPC ....... *H04N 5/23245* (2013.01); *G06Q 30/0601* (2013.01); *H04N 5/262* (2013.01); *G11B 27/28* (2013.01); *G06Q 30/0253* (2013.01); *G11B 27/347* (2013.01); *H04N 5/23293* (2013.01); *G11B 27/034* (2013.01); *G06Q 50/184* (2013.01)
USPC ................ 348/333.02; 386/282; 386/287

(58) Field of Classification Search
USPC .................. 348/239, 333.01, 333.02, 333.05; 386/278, 280–282, 285–287, 290
See application file for complete search history.

(56) References Cited

U.S. PATENT DOCUMENTS

| | | | |
|---|---|---|---|
| 6,237,010 B1 | 5/2001 | Hui et al. | |
| 6,557,017 B1 | 4/2003 | Venable | |
| 7,657,835 B2 | 2/2010 | Mindrum | |
| 7,675,635 B2 | 3/2010 | Tsue et al. | |
| 7,716,572 B2 * | 5/2010 | Beauregard et al. | 715/223 |
| 7,801,413 B2 | 9/2010 | Terakado et al. | |

(Continued)

OTHER PUBLICATIONS

Office Action dated Dec. 3, 2012 in U.S. Appl. No. 12/716,231, 6 pages.

(Continued)

*Primary Examiner* — Timothy J Henn
(74) *Attorney, Agent, or Firm* — Vierra Magen Marcus LLP

(57) ABSTRACT

The invention allows for persons to create motion photo videos or MPVs from photographs, video segments, personal narratives or animation by use of templates. Templates are created for specific songs, may be created or further modified by any person. MPVs are novel because they very quickly and inexpensively enable users to select a song and accompanying pre-made template and create a high-quality synchronized custom music video using their own hand-selected visual material. These custom videos can be shared by users with friends or can be published on the Internet and can be easily modified by swapping visual material or updating templates. Additionally, image capture devices may be employed to assist the user in capture, composition, and selection of images to be placed in pre-defined template bins, resulting in instant high-quality director-assisted video creation.

31 Claims, 19 Drawing Sheets

(56) References Cited

U.S. PATENT DOCUMENTS

| | | | |
|---|---|---|---|
| 7,957,835 B2 | 6/2011 | Suga et al. | |
| 8,166,391 B2 | 4/2012 | Kaneko | |
| 8,196,032 B2 | 6/2012 | Hua et al. | |
| 8,449,360 B2* | 5/2013 | Stoddard et al. | 463/7 |
| 2001/0027454 A1 | 10/2001 | Tsue | |
| 2001/0030660 A1 | 10/2001 | Zainoulline | |
| 2001/0048802 A1* | 12/2001 | Nakajima et al. | 386/46 |
| 2002/0019833 A1 | 2/2002 | Hanamoto | |
| 2003/0160944 A1* | 8/2003 | Foote et al. | 352/1 |
| 2005/0084232 A1* | 4/2005 | Herberger et al. | 386/4 |
| 2005/0181762 A1 | 8/2005 | Kauppila | |
| 2005/0198571 A1 | 9/2005 | Kramer et al. | |
| 2005/0206751 A1 | 9/2005 | Manico | |
| 2006/0053468 A1 | 3/2006 | Sudoh et al. | |
| 2006/0069999 A1 | 3/2006 | Mitsuhashi | |
| 2006/0126088 A1* | 6/2006 | Inoue et al. | 358/1.12 |
| 2006/0279555 A1* | 12/2006 | Ono | 345/173 |
| 2007/0116433 A1* | 5/2007 | Manico et al. | 386/95 |
| 2007/0130015 A1 | 6/2007 | Starr et al. | |
| 2007/0211961 A1* | 9/2007 | Sugimoto | 382/276 |
| 2007/0220002 A1 | 9/2007 | Teodorescu et al. | |
| 2007/0238082 A1 | 10/2007 | Ingrassia | |
| 2008/0016114 A1 | 1/2008 | Beauregard et al. | |
| 2008/0028298 A1* | 1/2008 | Kaneko | 715/243 |
| 2008/0126939 A1 | 5/2008 | Chung et al. | |
| 2008/0168365 A1 | 7/2008 | Chaudhri | |
| 2009/0049371 A1 | 2/2009 | Keng | |
| 2009/0052734 A1 | 2/2009 | Hosaka et al. | |
| 2009/0066730 A1 | 3/2009 | Mikawa | |
| 2009/0115855 A1* | 5/2009 | Gotoh et al. | 348/207.11 |
| 2009/0204243 A1 | 8/2009 | Marwaha et al. | |
| 2009/0228922 A1 | 9/2009 | Haj-Khalil et al. | |
| 2009/0237704 A1 | 9/2009 | Minowa | |
| 2009/0249177 A1 | 10/2009 | Yamaji et al. | |
| 2009/0265334 A1 | 10/2009 | Narayanan et al. | |
| 2010/0241939 A1 | 9/2010 | Rozen-Atzmon | |

OTHER PUBLICATIONS

Response to Office Action filed Jan. 2, 2013 in U.S. Appl. No. 12/716,231, 7 pages.
Office Action dated Feb. 15, 2013 in U.S. Appl. No. 12/716,231, 22 pages.
Response to Office Action filed Jun. 11, 2013 in U.S. Appl. No. 12/716,231, 20 pages.
Office Action dated Sep. 25, 2013 in U.S. Appl. No. 12/716,231, 23 pages.
Response to Office Action filed Feb. 25, 2014 in U.S. Appl. No. 12/716,231, 14 pages.

* cited by examiner

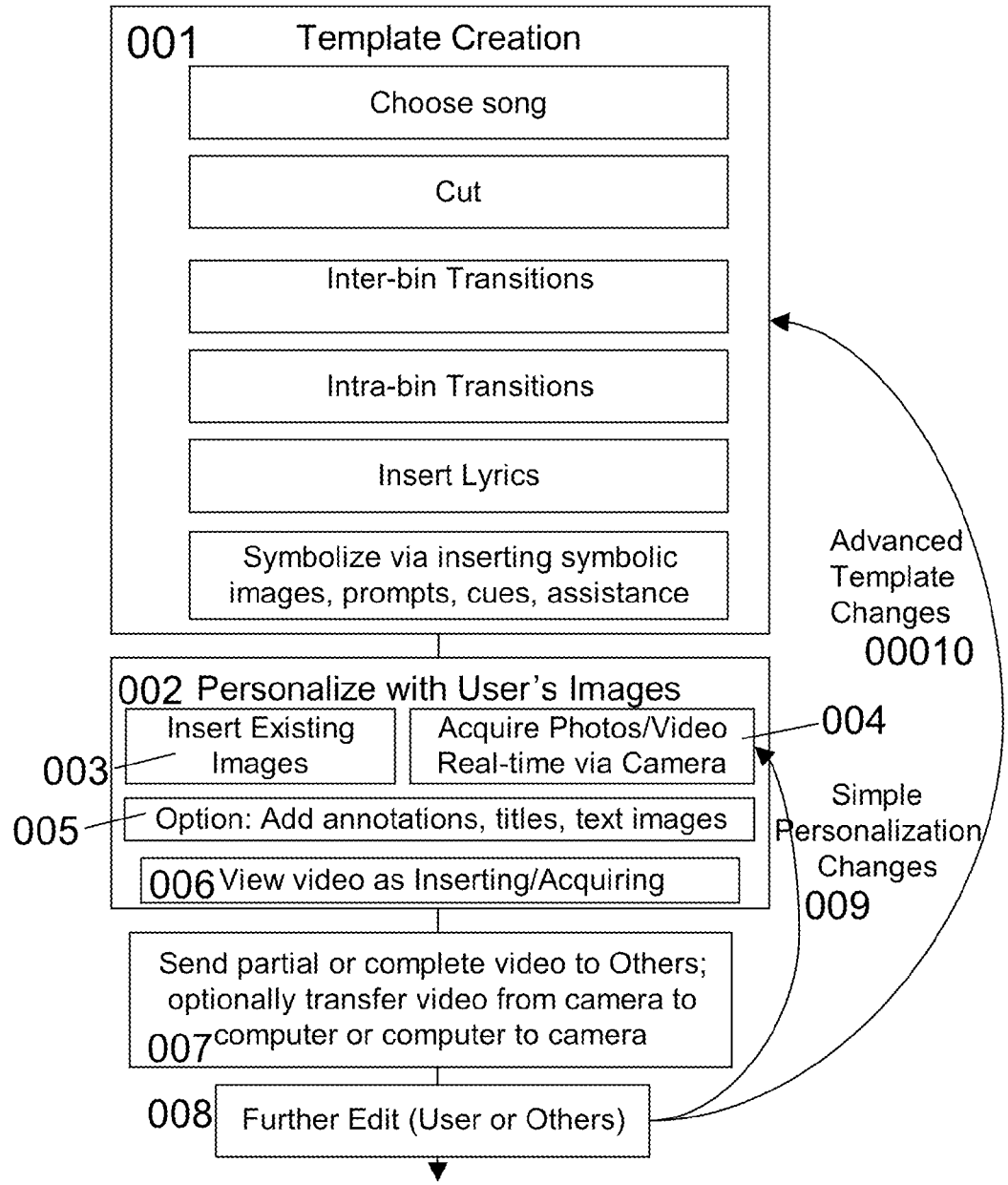
FIG. 1 – Template Creation Process by Template Composer and Subsequent Personalization by End User

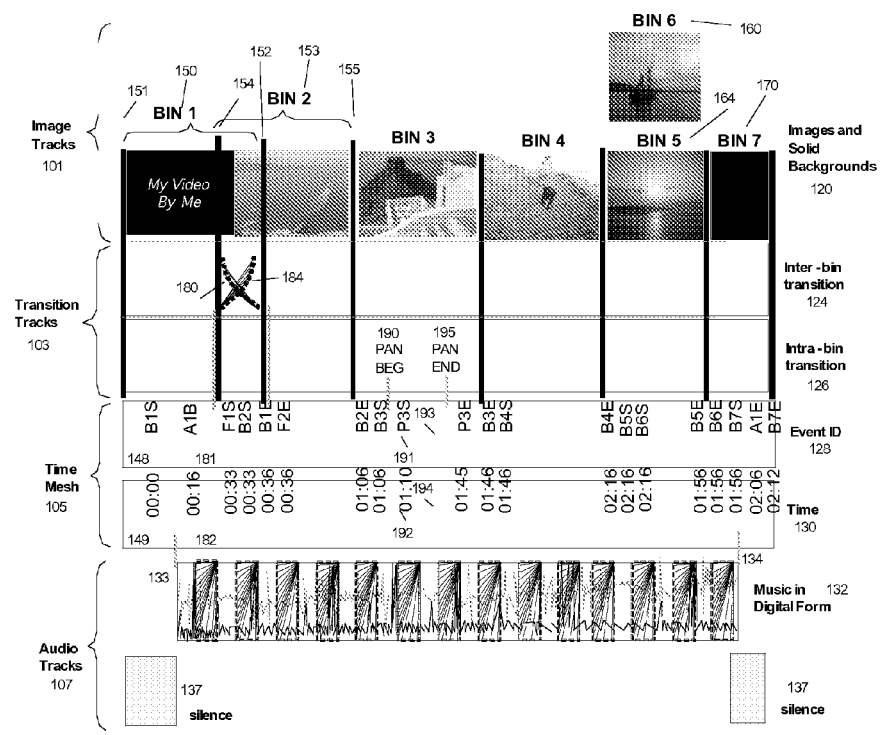
FIG. 2 — Illustration of the Time Mesh Scheduling of Template Events

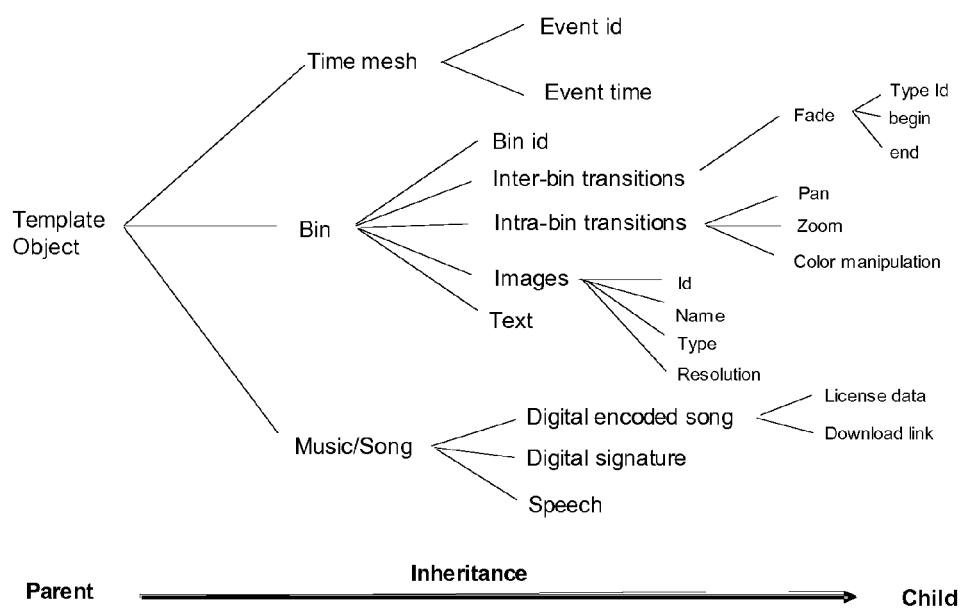
FIG. 3 – A Taxonomy of Template Objects

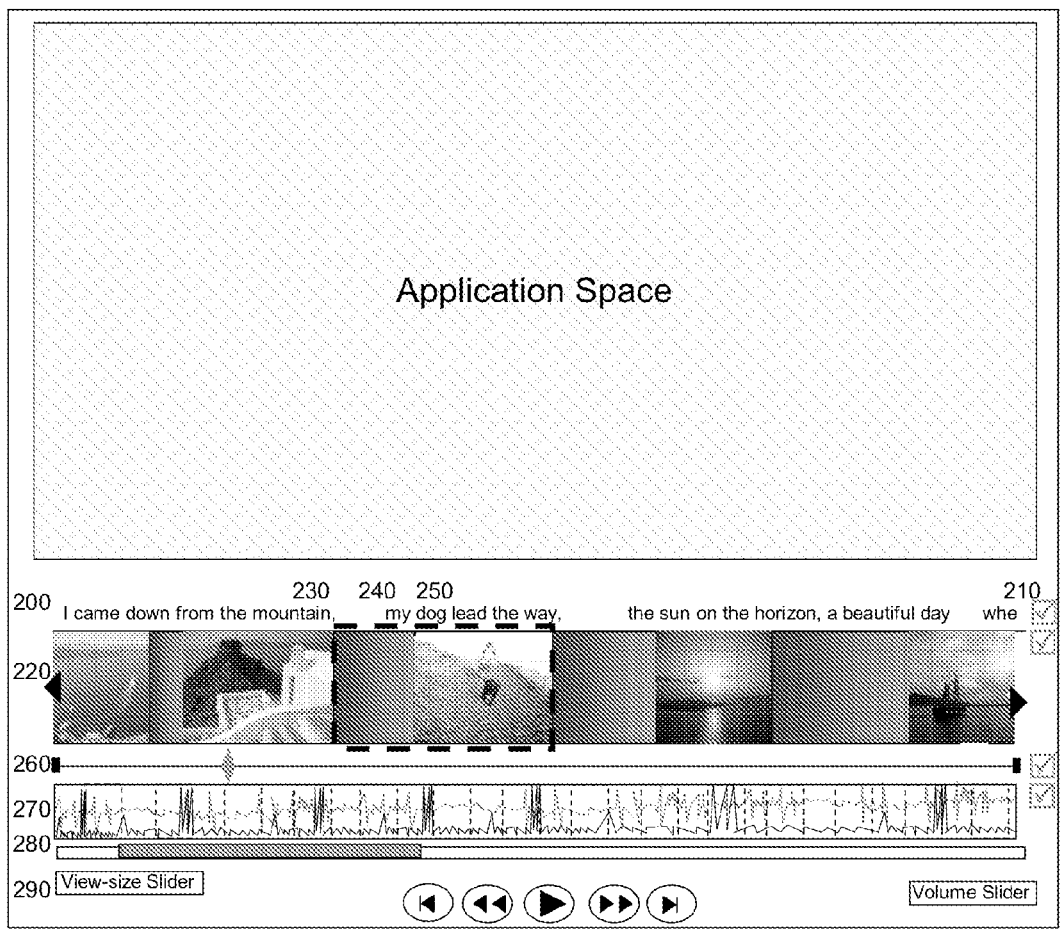
FIG. 4 —Timing Mesh that Synchronizes Music, Images, and Transitions

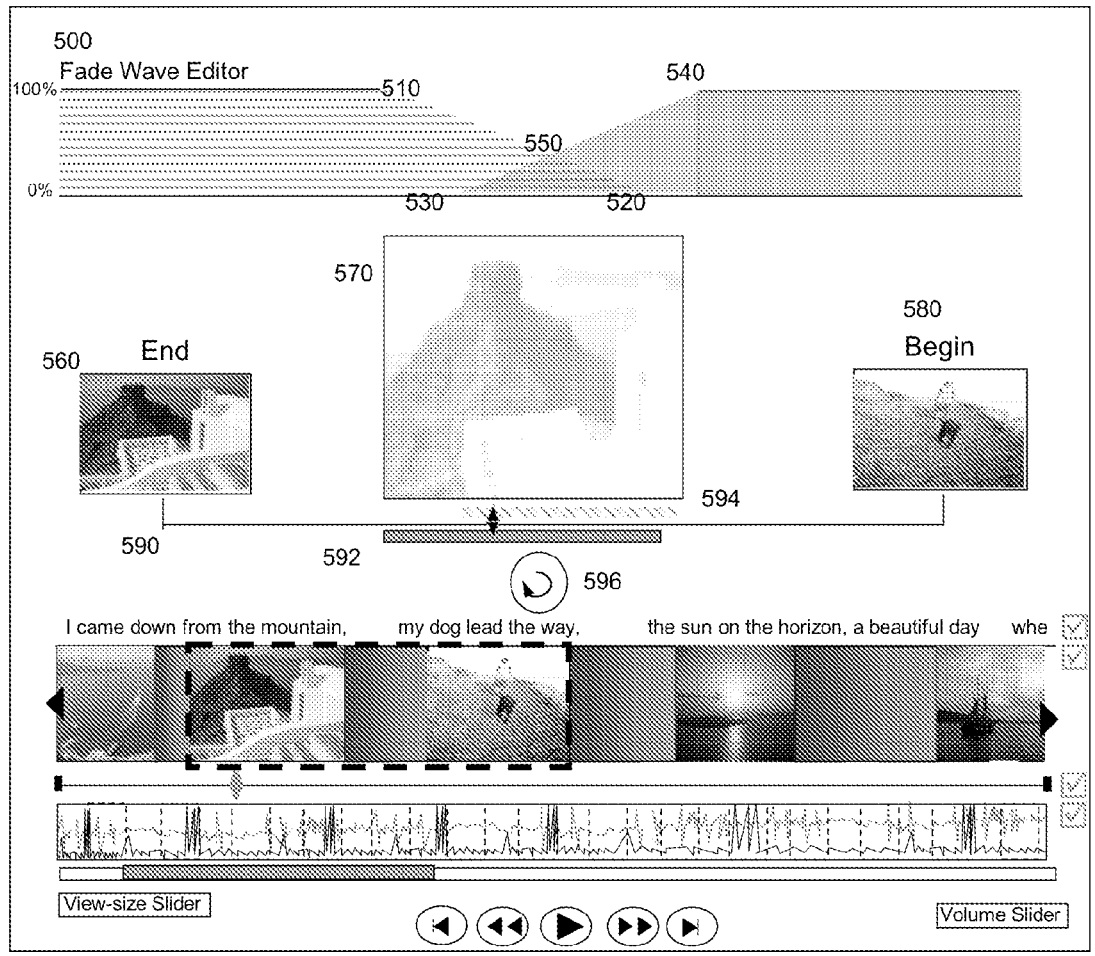
FIG. 5 — Inter-bin transition GUI based editor

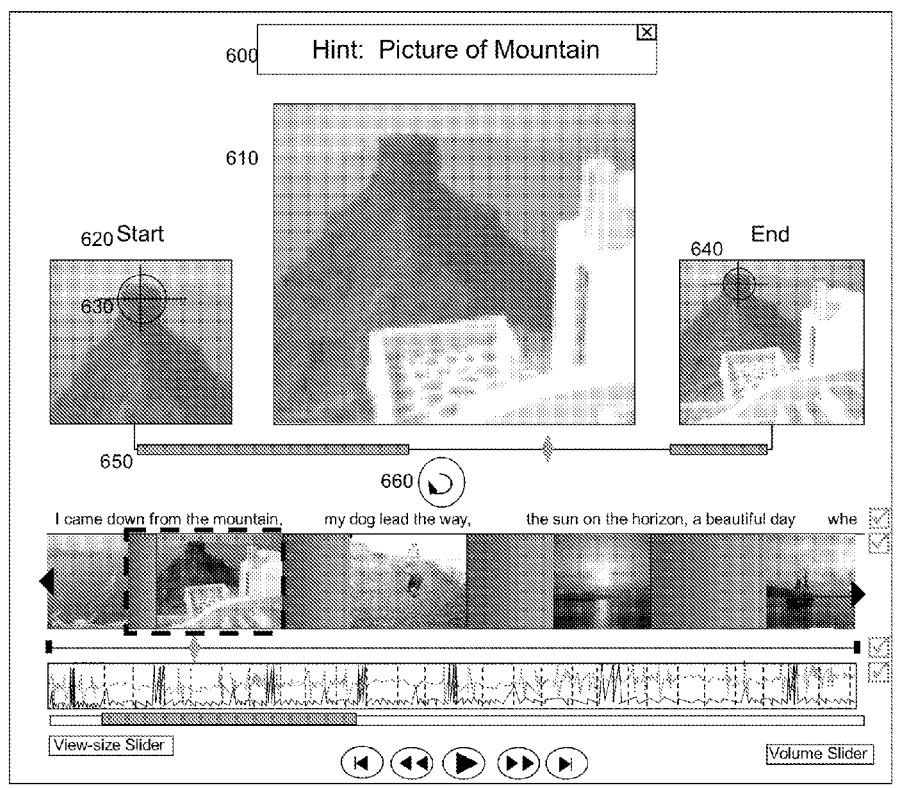
FIG. 6 – Intra-bin transition GUI based editor

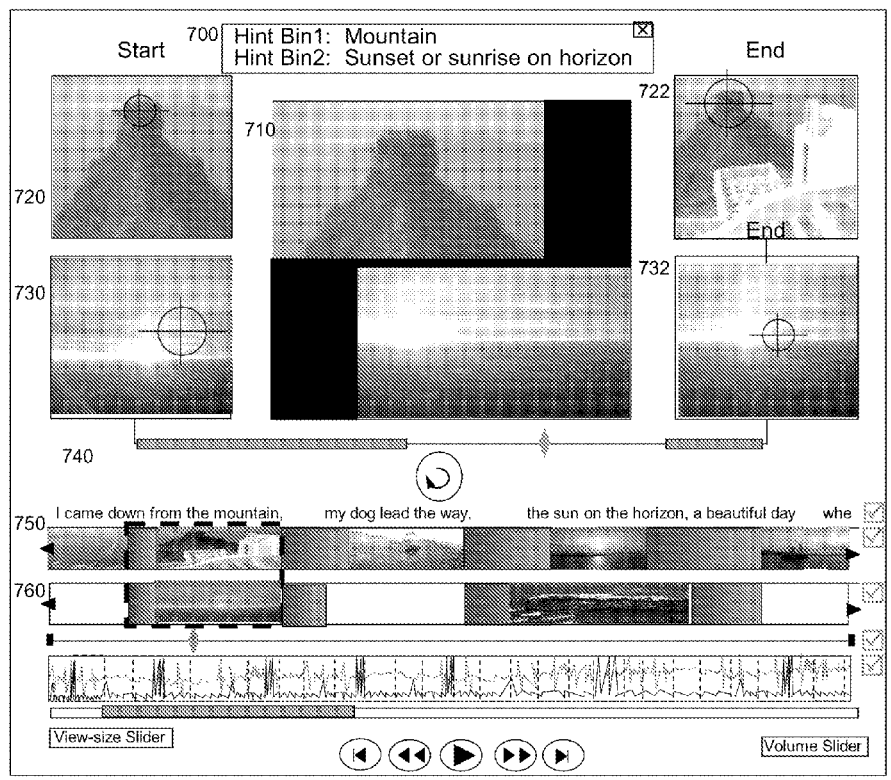
FIG. 7 — Intra-transition Viewing and Editing Application with Multiple Overlapping Bins

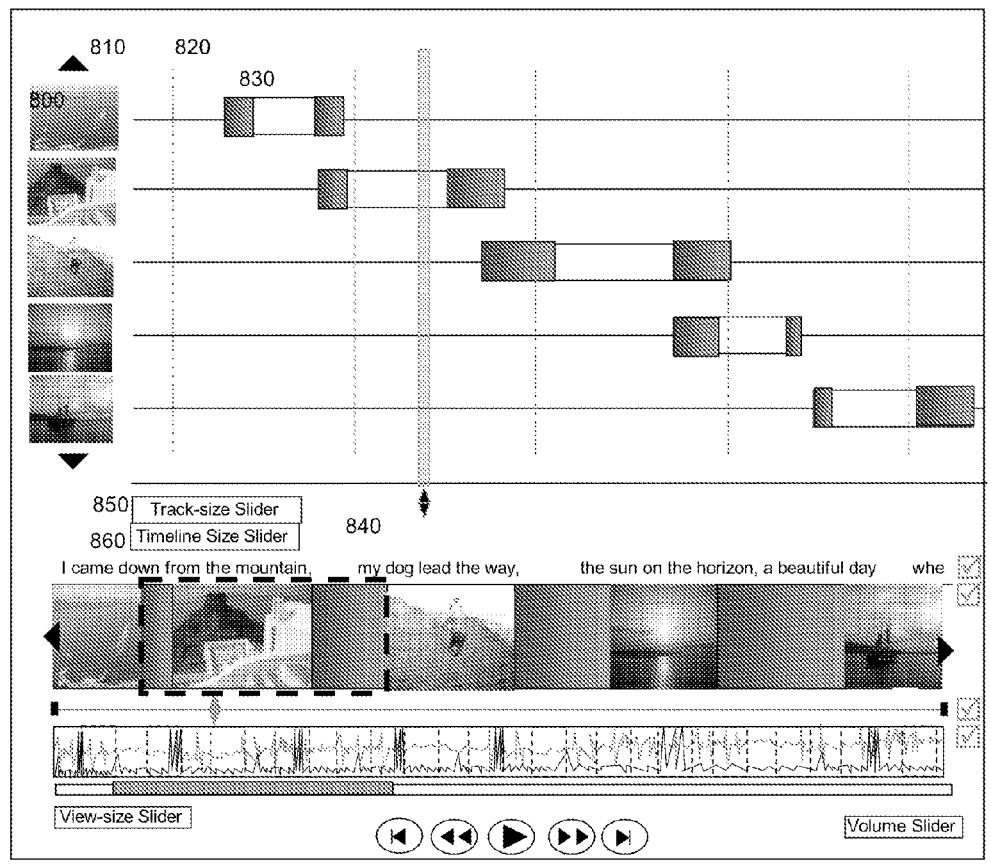
FIG. 8 - Separated Track View Mode for Bins

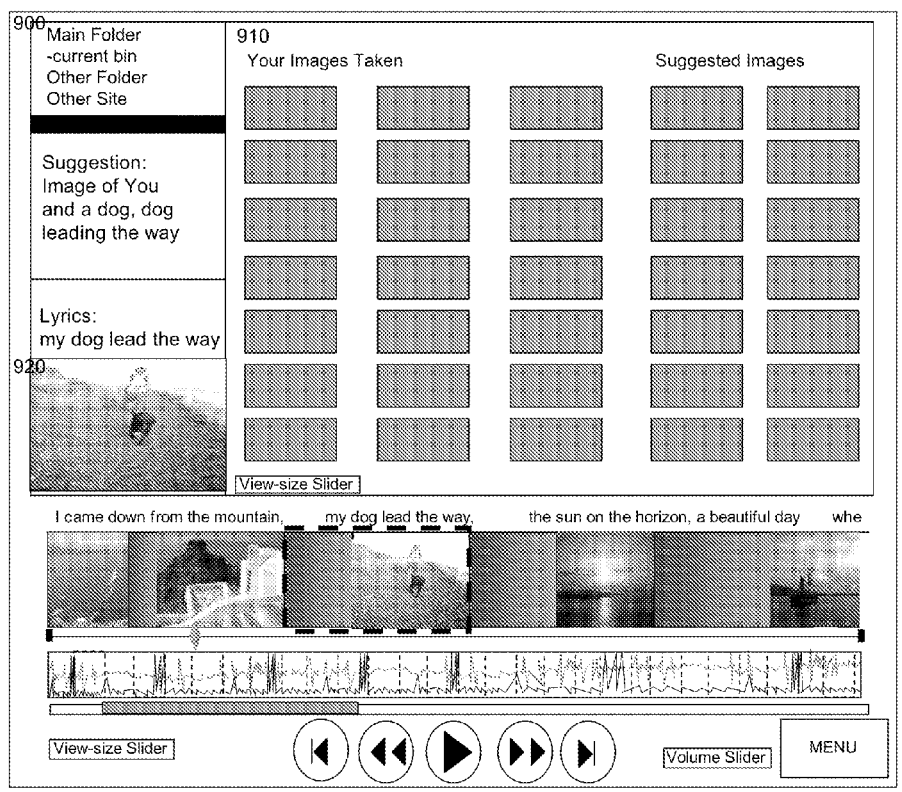
FIG. 9 - Image Selection Tool

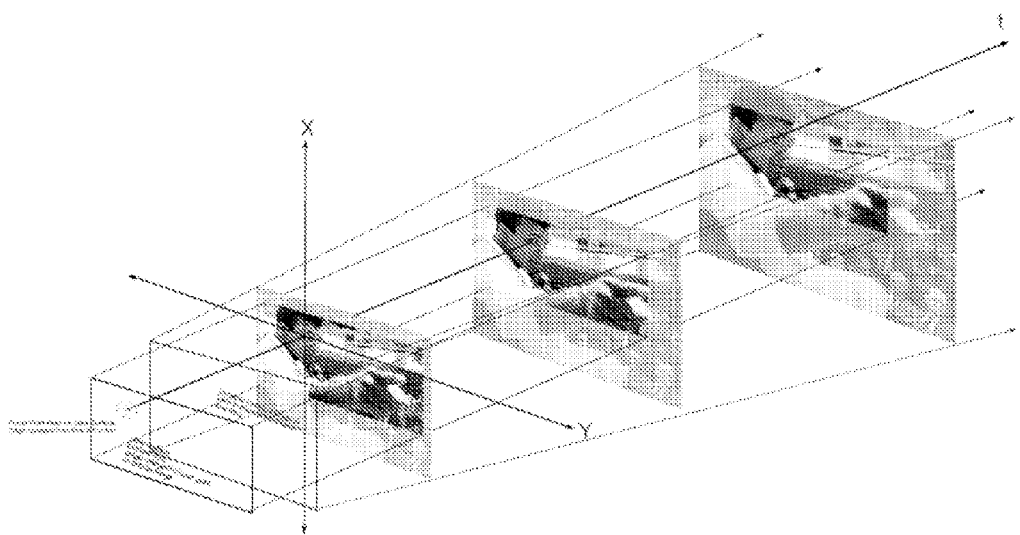
FIG. 10 — Method to create a focal point or trajectory for the focal point during manipulation of an image during a transition effect.

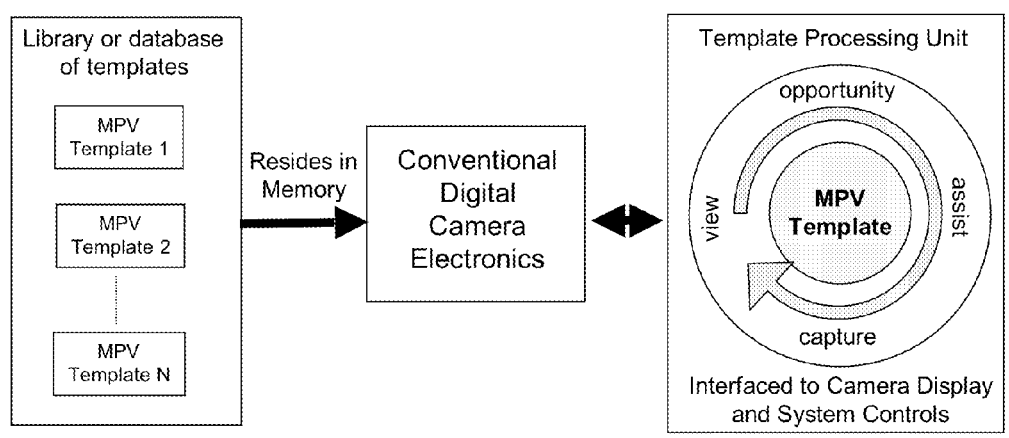
FIG. 11 — Camera based template software may provide multiple functions during operation of the camera

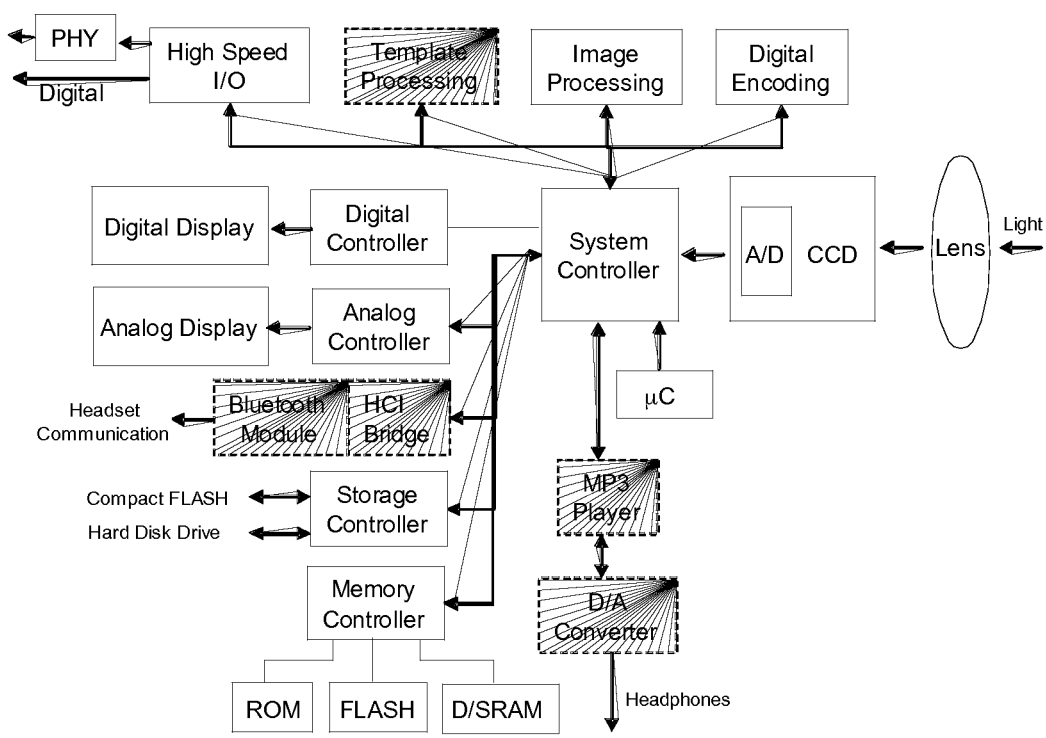
FIG. 12 – Digital Camera System with Template Processing Unit

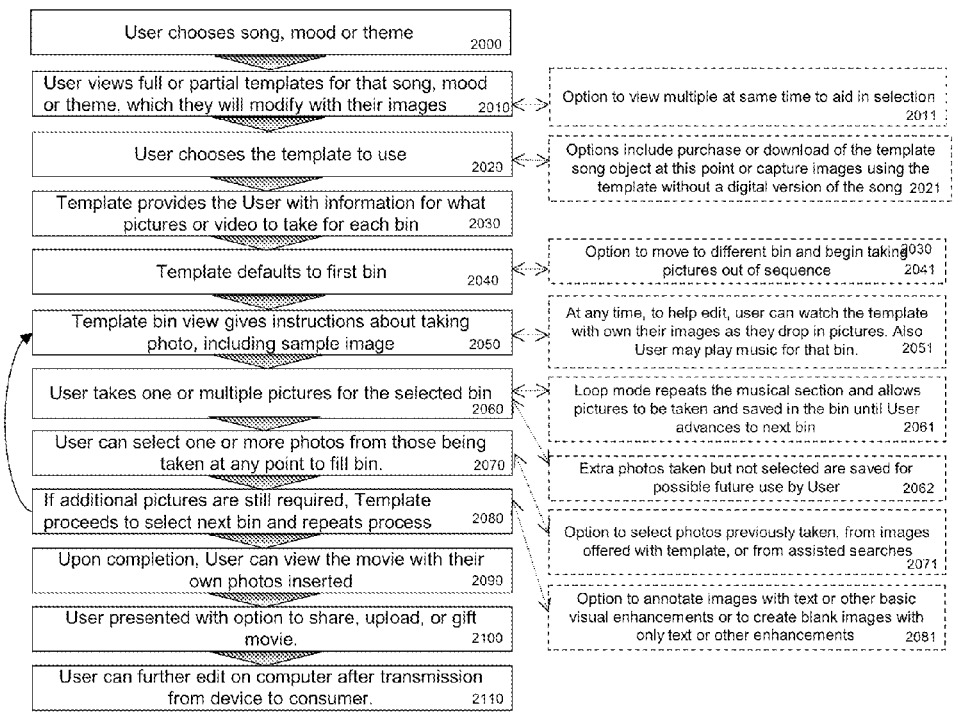
FIG. 13 – Flow for template enabled image composition and capture

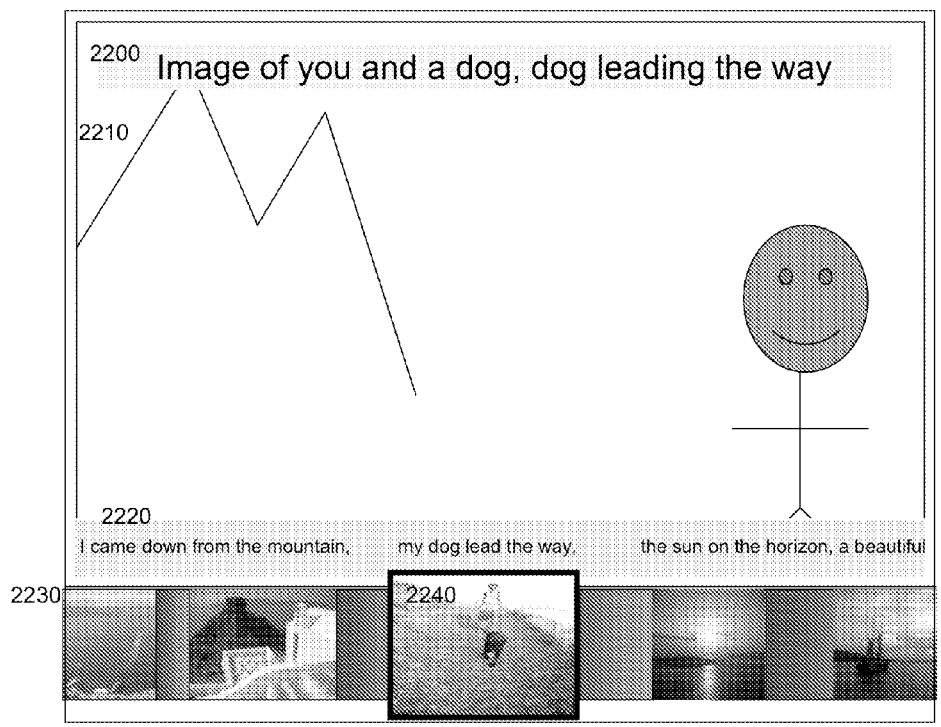
FIG. 14 – Live Camera Viewer during Image Capture with Assistant

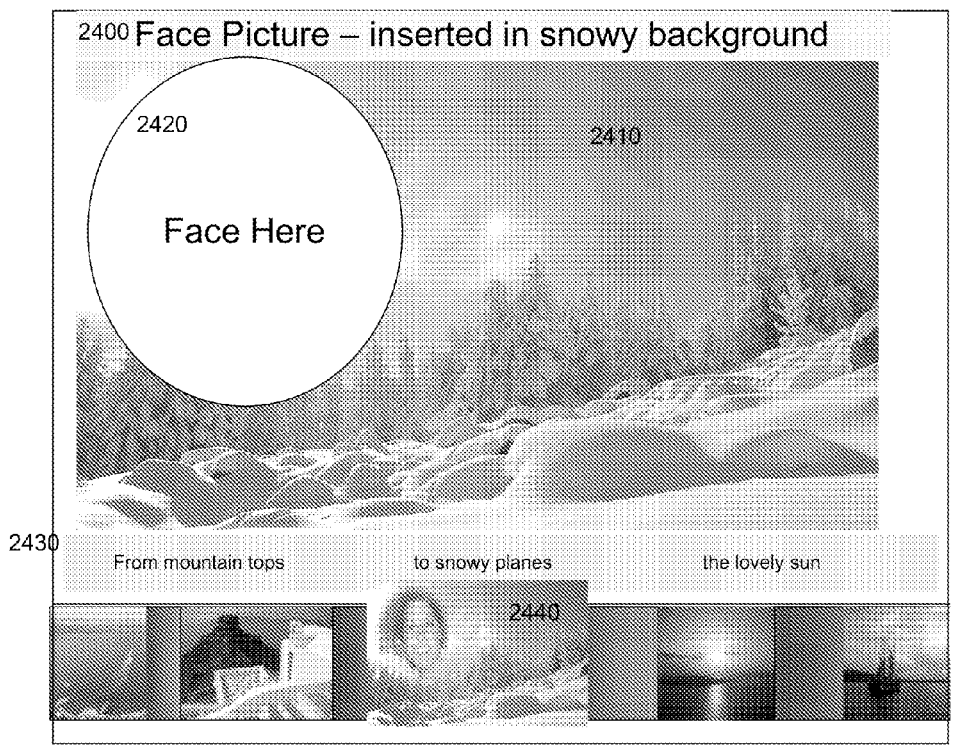
FIG. 15 — Live Camera Viewer during Image Capture with Background and Pre-defined Area for Image to be Placed

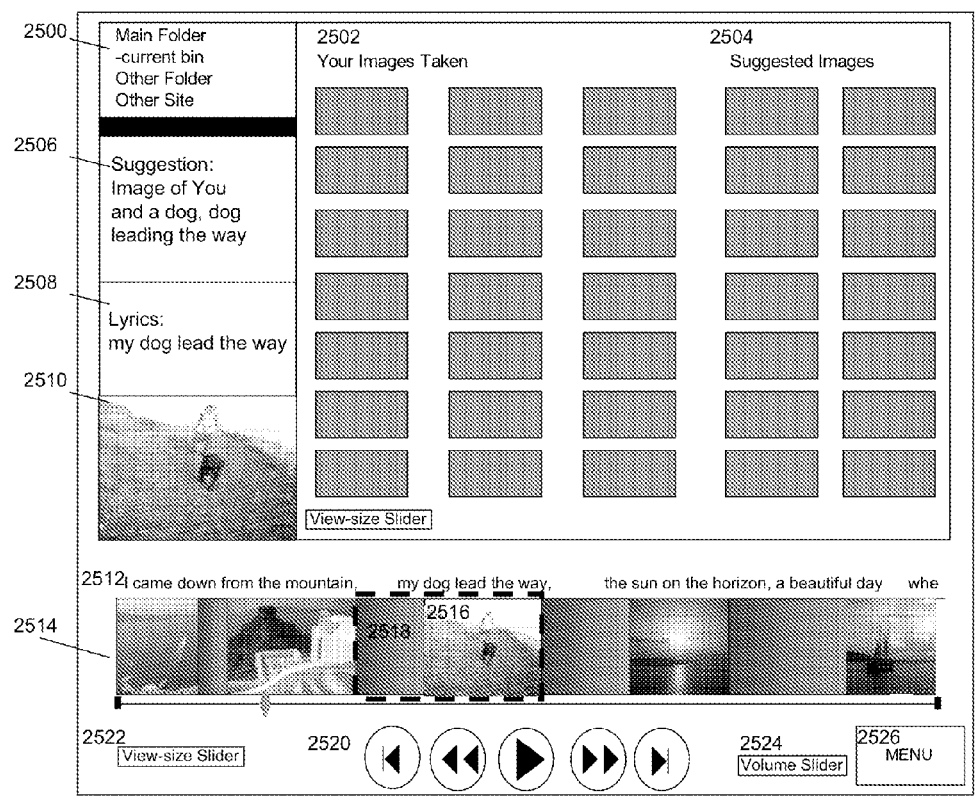
FIG. 16 — Portable Device or Camera-based Image Selector Screen

FIG. 17 — Edit Mode on Device

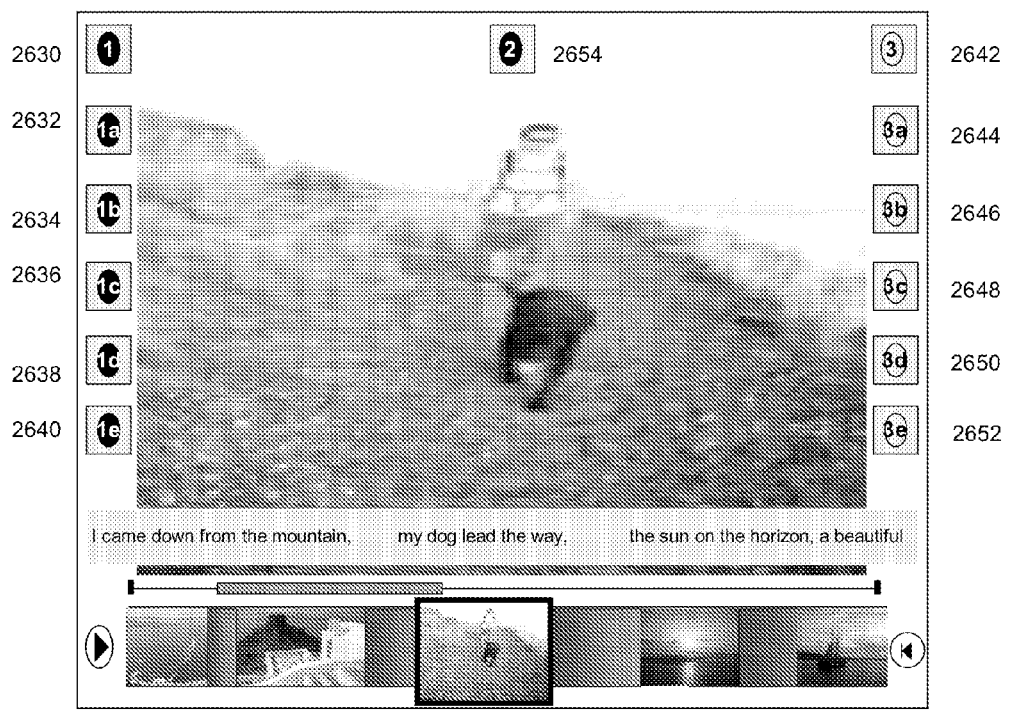
FIG. 18 - Edit Mode on Device with Extra Functions and Slider

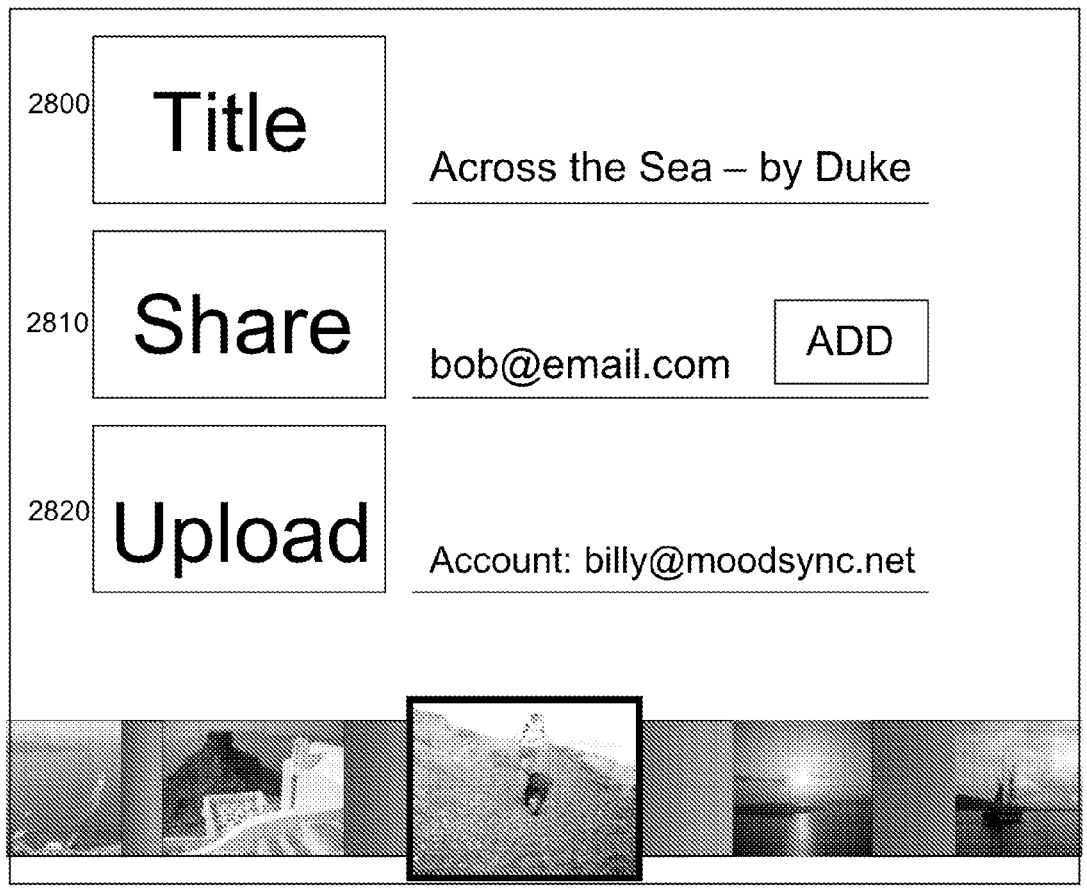
FIG. 19 — Camera-based Title Creation and Share Screen

ASSISTED VIDEO CREATION UTILIZING A CAMERA

This nonprovisional utility patent application claims the benefit of the priority date of provisional application #61/156,871 filed Mar. 2, 2009.

1.0 BACKGROUND AND SUMMARY

The invention allows for persons to create a new medium called motion photos video or MPVs from photographs, video segments, personal narratives or animation by use of templates. MPVs are novel because they very quickly and inexpensively enable users to select a song and create a high-quality synchronized custom music video using their own hand-selected visual material by use of a human-generated pre-made template. These custom videos can be shared by users with friends or can be published on the Internet. Further, hey may be easily modified even after initial production because the template may travel with the viewable MPV, utilizing the source material to generate the MPV in real-time when a viewer chooses to view it. This allows modifications to occur in real-time.

Professionally produced videos require a script of what images to shoot or create. Camera crews then must acquire the footage and the resulting images are processed and modified. Artists then edit content, including when to start and end segments and how to transition between segments in order to tightly synchronize the visual aspects with the specific audio track. Though results are good, the process is expensive, time-consuming, and requires significant technical expertise to use video-editing software. The invention described herein provides a method to significantly reduce the time, cost, and complexity of creating a coherent, professional video by utilizing a pre-made template on an image capture device to guide an unsophisticated user in capturing appropriate footage for the video, and further allowing instant creation of personalized videos using the captured images or other user-selected images via placement directly in the template.

By use of the invention, users with commonly available electronics such as PCs, cameras, and camera-phones will be able to instantly or in real-time create videos that capture events, such as birthdays, vacations, and sports seasons, or moods, such as happiness of being with a friend or the feeling of missing somebody. Users can select, and possibly purchase, a popular song and have a ready-made template into which they can overlay their images for an instant finished product, creating their own customized music video. Videos can also be produced without music though we describe the rest of the invention hereafter utilizing music for clarity of the explanation.

Users are guided through the video creation process by sets of instructions and image sequences that are pre-defined by template composers. Any person can be a template composer. These instructions are invaluable to ordinary users as it allows a coherent story to be personalized with their own visuals without the tedium of defining start, stop, and transition images or going through the effort of listing out the order or flow of images to create the story. There are no existing integrated tools that assist users in identifying which images to capture or insert and that allow instant placement of these images in a human-created pre-defined template with the goal of immediate production of a finished video, customized and further modifiable by the user. Existing computer systems require users to modify nearly all aspects of a video or they provide a basic template with no synchronization defined by humans. The resulting task for the end user is either too complicated or so limiting that the user cannot modify critical aspects. Several automated tools allow for selection of images by a user that are automatically placed into a pre-defined template or a template that is not pre-defined. This invention specifically requires users to select images for placement into bins that are pre-specified, wherein selection may occur explicitly, in the course of the capture process, or by changing an order of images randomly pre-determined. A bin can be considered an object in software that corresponds to a fixed slot of time and contains or will contain objects related to a specific image, such as transition effects, text or annotated speech. These bins, and associated data about when and what occurs within the bin, allow for very tight synchronization with the audio source, as well as valuable instruction to the user who is determining which imagery to supply into the bin.

There are multiple components in the creation of an MPV: (1) template creation, (2) use of template to assist in the composition and capture of photos in real-time with the purpose of instant MPV creation using existing camera technology or modified camera hardware or software technology for the capture of images, and (3) use of a template to compose an MPV with pre-existing images with the purpose of creating an MPV. This invention focuses on the use of templates with digital camera and camera equipped devices, including software based virtual cameras designed to simulate the camera experience. In this use, one or more template software objects reside on a digital camera or camera equipped device. The user selects a template which guides the user in the composition or capture of an image for each bin in a given template. It is not required but the user may also be able to listen to the song object associated with the template to further guide composition and capture. The user may select a template that has a commercially available song associated with it and the user may choose to purchase and download the song for the photo shoot. The template allows the user to fill in each bin with one or more captured images and create an MPV. The resulting MPV may be sent to another user or another digital device such as a computer or a television.

1.1 BRIEF DESCRIPTION OF THE DRAWINGS

FIG. 1 shows the template creation process by a template composer and subsequent personalization by an end user.

FIG. 2 shows an illustration of the time mesh scheduling of template events.

FIG. 3 show a taxonomy of template objects.

FIG. 4 shows a timing mesh that synchronizes music, images, and transitions.

FIG. 5 shows an inter-bin transition GUI based editor

FIG. 6 shows an intra-bin transition GUI based editor

FIG. 7 shows an intra-transition viewing and editing application with multiple overlapping bins.

FIG. 8 show a separated track view mode for bins.

FIG. 9 shows an image selection tool.

FIG. 10 shows a method to create a focal point or trajectory for the focal point during manipulation of an image during a transition effect.

FIG. 11 shows a camera template software which may provide multiple functions during operation of the camera.

FIG. 12 shows a digital camera system with a template processing unit.

FIG. 13 shows a flow for template enabled image composition and capture

FIG. 14 shows a live camera viewer during image capture with assistant.

FIG. 15 shows a live camera viewer during image capture with background and pre-defined area for an image to be placed.

FIG. 16 shows a portable device or camera-based image selector screen.

FIG. 17 shows an edit mode on a device.

FIG. 18 shows an edit mode on a device with extra functions and a slider.

FIG. 19 shows a camera-based title creation and share screen.

2.0 DETAILED DESCRIPTION

This invention describes the creation of an MPV using a template to assist in the composition and capture or composition and selection of photos residing on the camera or camera-equipped device with the purpose of instant or future MPV creation using existing camera technology or modified camera hardware or software. This invention focuses on the use of templates with cameras or camera equipped devices, All references to cameras or camera-equipped devices implicitly includes the use of virtual cameras which simulate the use of a camera by allowing a user to view pre-recorded footage as if it were live footage available to a camera user. Section 2.1 describes the template creation process and the template object that results. Section 2.2 describes the use of the template with a camera.

2.1 Template Creation

Template composers use tools that offer features to define image starts, stops, and transitions, as well as editing features relating to focus, movement, and other operations to be performed on images. Template composers further edit instruction sets for end users by providing instructions about which images should be placed by users in a particular bin, offering wording and/or sample symbolic images. Users can then modify these templates in limited ways by substituting their own images, either acquiring images in real-time based on instructions, or by replacing sample images with already existing images selected by the user. This section begins with a summary of the template creation process in FIG. 1 and is then followed by detailed descriptions of several key components in the process.

FIG. 1 summarizes a typical process undertaken by a template composer in the creation of a template. The template composer first chooses a song and then, while listening to the song, cuts the timeline of the song into bins. Each bin is defined by where a new image will begin to appear and where an image will disappear. These bins are tied directly to the timeline of the song and can be edited graphically, with or without an image occupying the bin, for precision as defined below in an object called a time mesh. An image may be defined as a single digital image or photograph, a video object, or an animated video object. The most common use will likely be a single digital photograph per bin and that representation will be used in the following examples and description. However the invention envisions other forms of image related media being used and versions of the software will enable additional forms of images to be used.

The time mesh maintains a schedule of template object events. The template objects include bin objects in the form of images or transition effects such as fades, pans and zooms. The template objects also include audio tracks such as music in digital form where the events may include the song beginning and end. An embodiment of a time mesh could be a table where one column contains the event identification tag and another column that represents the time at which the event is executed.

Bins are not automatically determined by computer, but may utilize computational tools to assist in the creation of bin boundaries, such as bass patterns, drum beats, voice tracks, or volume levels as described in FIG. 2 (005). These characterizations of an audio signal would provide visual waveforms in organized rows to the template composer, allowing visual understanding of patterns in the music. Bins are more likely to follow the phrasing of a song rather than actual beats in order to make the transitions less routine and contain more feeling. A key element here is that a template composer ultimately determines where the bin boundaries occur, and can easily modify them in the time mesh defined in FIG. 2.

A template composer may begin the video at a different start time than the song, for example to avoid the crowd cheering at the beginning or to avoid a few second of blank space that exist on one digital copy but not on another, such that the song selected would have an accompanying fingerprint that identifies when the song starts; this fingerprint could be compared to other copies of the song to identify precisely where to begin the song, as well as ensuring the songs are played at the same speed and can arrive at a common endpoint even if one plays longer than another.

The template composer then performs inter-bin transitions, also referred to as blending, between bins to define how one bin fades in as another fades out. Blending can be any type of entry of one or more images and/or exit of one or more images. The template composer then creates intra-bin transitions that describes whether a photo zooms in or out, or changes color or undergoes another visual augmentation such as sharpen or fade to grey. The intra-bin transition data is fine tuned to the specific bin, such as placing a fast moving zoom or a fade from color to black and white to match the feeling of the song at that point. The intra-bin transition data is later fine-tuned to the particular image that is placed into a bin so that it captures the full artistic intent of the template composer, such as targeting a zoom on the eyes of a person in an image. Lyrics are then synchronized to the bins, and the template composer inserts photos manually or automatically based on lyrics or instructions inserted by the template composer. These images symbolize which types or examples of images an end user could insert to follow the storyline of the video, as appropriate for the specific bin. The template composer can insert additional information such as prompts, cues, or instructions about what images to insert into the bin. Some images inserted by the template composer can have cut-out sections where they serve as backgrounds for parts of images provided by an end user, such as a snowy background with a circle overlay where a person's head appears. The background template image can be inverted so that there are parts provided by the template composer, such as text or other visuals, that overlay over an end user's images. These steps can be completed in any order after the cut occurs, or they can occur simultaneously through use of tools that can capture movement of an individual and be decoded to cause the actions of cut, blend, and intra-bin transitions to occur. The template can then be packaged up and made available to a user who can swap images and perform very limited fine tuning to personalize the video to their liking.

FIG. 1 (002) describes the actions of a user who has received the template on their PC or other electronic device. They are instructed along the series of images in the template about which images to capture or insert at a given bin. These images might originate in real-time from a camera, be supplied by the template composer along with the template, come from a user's existing image library, or originate from the Internet based on keyword information supplied by the template composer or lyrical data. Sliding these images into the template produces a ready-made video. After the user selects the images for each bin, the user can optionally add basic annotations to their liking or as described by the template composer. Finally, the user can upload the video to the Internet where it can be accessed later from other devices. It can be shared in this method by selecting friends with which to share the video or an Internet site on which it may be posted. The video is comprised of zero or more of the each of the following: song, images (photos, video, or other imagery), and transition information, all synchronized to the time mesh.

FIG. 2 describes an embodiment of the time mesh and how it may be used to schedule the execution of template object events. The template objects may be organized or visualized along a time line in terms of the object type, such image tracks 101, transition tracks 103, time mesh 105, and audio tracks, 107. The template parent object has three main child objects, bins 150 153, time mesh 105 and music/audio objects 132 137. The time mesh object 105 may have two child objects, the event identification 128 and event execution time 130 objects. These two objects contain the schedule of events for all template events and may be stored in the form of a table. Another embodiment may use a time mesh with a single event id that references execution time and instructions. The time mesh may have multiple events with the same execution time when in reality the template and MPV software will order the instructions for the microprocessor. The result between two events executed with milliseconds will likely give the appearance of synchronization to the viewer, and computer processing may combine overlapping instructions when appropriate prior to providing visual or audio output so that the actual output is consistent with all the instruction sets. The events could also be staggered in time, for example in the milliseconds, for other embodiments.

The bin parent object 150 includes multiple child objects that include an image 120, inter-bin transitions 124 such as fades, intra-bin transitions 126 such as pans and zooms 126. A given bin 150 is defined by start 151 and end 152 events. In the example shown in FIG. 2, bin 2 overlaps with bin 1 with a fade in 184 as bin 1 fades out 180. The other bins 3-7 are shown here with hard transitions and no fades so that other features can be more easily identified. For example, the time mesh will contain an event id, for example B1S 148 and an event time 149 corresponding to the beginning of bin 1. The time mesh will track the beginning and end of all bins as shown in the figure as binI start BS1 and end BE1, bin 2 start B2S and end B2E and continues to bin 7 start BS7 and end BS7. Bins may overlap as shown in bin 5160 and bin 6 164 where images may be superimposed, e.g. to form a sequence. It is not shown in this figure, but one embodiment might have audio objects that belong to a given parent bin object. One example is a birthday related template where the last bin has a placeholder for the user to record their a personal birthday greeting. Since the audio object belongs to a given bin it can only be played during the fixed time slot defined for a given bin.

The bins will normally be sequenced with the music track but there may be cases where a bin contains a title slide 150 or a credits slide 170 that correspond to silence 137. The silence may be stored as entries in the time mesh or as shown here, the absence of a music track is treated as silence without an explicit time mesh entry. The bin can be considered as a container of objects including a specific image and data such as transition effects that generally applies to an image. The bin may exist without any specific image, and image data in a given bin may be replaced or modified at any time. The inter-bin transition objects 124 control the effects associated with the transition of one image to another such as where one image fades out 184 or fades in 180. The fade transition events are recorded in the time mesh with the event id 181 and event execution time 181. The inter-bin transitions will normally overlap from one bin to another. The intra-bin transition objects control how a given bin manipulates an image in terms of composition, such as pans, zooms and color manipulations. One example is the use of pan to move a viewing window from the left of the image to the right where the time mesh contains the pan event id 191 and time 192 associated with the beginning 190 contains information regarding on how the pan is executed in terms of speed and perimeter of the bounding box being viewed. The bins may include objects that can and cannot be altered by additional contributors or template users. An example is a non-modified bin at that beginning that adds a corporate branding image or icon with either silence or a short audio segment.

The music object 132 exists in digital form as a music file or a digital signature. A digital signature is a digital transformation, such as a wavelet transform, that identifies unique characteristics of a song related to synchronization with bin objects. The digital signature may be used to synchronize a downloaded version of the song to the time mesh by using pattern matching between the templated stored signature and a transformation of the downloaded song. The matching may be as simple as locating the beginning of the downloaded song and meshing it to the song begin event 133. The matching may include convolution of the two signals to find the best match. The matching may include stretching and scaling the two signatures to address situations where the template creation may be done with a different encoding of the song than the song that may be downloaded at a later date. The matching may also include cutting portions of a song, such as the beginning or end, to make the song used by the user consistent with the song used by the template composer, or cutting bins out of the MPV to be consistent with the song provided by the user.

While the template architecture doesn't require an object oriented software architecture for implementation, a preferred embodiment uses it to allow for an extensible and flexible architecture. This architecture will allow modifications to be made and existing templates to be easily updated without breaking the existing template. For example, if a creator updates their images to use a new inter-bin transition effect the changes can be rolled out across the current template and all modifications thereof. It also allows for reuse of existing template objects for example a company may create several templates based on the advertising campaign with a template for specific products within a given line. In this embodiment, elements of the template for example opening and closing branding, campaign messages and transition effects can be consistent with the images and songs changing. It is also preferred that permissions on each object be maintained so that the template creator can control which objects can and cannot be modified by subsequent template creation contributors or by a template user.

A taxonomy of template objects is provided as an example in FIG. 3. In this example the parent template objects has three child objects: bin, time mesh and song. Each of these objects has child objects. For example, each bin object may have an id, image, transition effects and text associated with it. The inter-bin and intra-bin objects have transition effects as described as part of the discussion associated with FIG. 2.

Importantly, embodiments may contain instructions which are references to libraries or instruction sets. For example, a template object such as an inter-bin transition may contain a reference call to a particular type of fade. That fade operation may be pre-defined in a library on a particular computing device or camera, or may be able to reference a library or set of instructions online which provide functionality or further reference to where functionality may be attained. The template utilizes reference call made by the fade to the instructions defined in the referenced software or hardware. This structure allows templates to take advantage of pre-existing routines on specific devices. Further, this structure allows updates relating to templates or specific hardware to be made online and referenced by existing templates. A template may contain a reference to another place which contains a reference to yet another place, and this process may contain any number of further references until the actual machine instructions to perform the action are retrieved.

Another embodiment maintains a list of contributors where a given template parent object may have additional template children associated with one or more contributors' modification. In this scenario, the template database may maintain an 'attribution' list where each contributor is recognized and automatically added to previous contributors in that inheritance chain. The list may include links to Internet-accessible sites that contain further updates, such as for insertion of new material, or additional referencing, such as modifications that occurred after the creation of the MPV being viewed. Another embodiment allows for the attribution list to share in any commercial proceeds or licensing event.

FIG. 4 shows elements of the timing mesh that is the resulting product of a template composer synchronizing music with images and transitions. It locks items independently to specific points in the song that are determined by the template composer and subsequent modification of parts generally occur independent of each other so that they may stay synchronized to the audio. 260 is a timeline of the song, 270 is a waveform characterizing the audio elements of the song. 250 is a slider to show which part of the song we can see in the box (the grey area indicates the part we see, the white is the entire video/song length). 200 indicates the lyrics that are synched to 220, the filmstrip of photos in order of when they appear. 230 is the previous image, 240 the transition to the next, and 250 the current image being shown. The dashed box around 240 and 250 is the element that is editable as described below. It can also extend to cover the preceding and following transition, or can encompass an image, an intermediate transition, and the following image, such that the encompassed area is editable as described below. 210, the checkboxes, allow certain elements to be displayed so that the composer can view or hide whichever of the aforementioned items are desired as such. They can be dragged up and down to reorder the elements described. 296 allows the filmstrip timeline to be increased or decreased in size, showing correspondingly less or more of the series and allowing easier editing. Template composers can drag sliders to navigate or use buttons as shown. Additionally, they may drag sides of the pictures or transitions to change where they occur in the timeline. The most important aspect of the timing mesh is that all elements here are synched to the timeline and not to each other, such that dragging an image left will change that image, but not the audio or any previous or subsequent images. They are instead locked into the timing mesh independently. The structure of the timing mesh also allows segments of an MPV to be cut and for the contained elements to be reindexed to a time mesh that starts at that segment time, as might occur when combining portions of two MPVs.

Template creation is facilitated by a graphical user interface (GUI) that provides visual aids to synchronize image selection and transitions to specific songs. Image transition selections can be described as two classes.

Inter-bin transitions describe visual effects associated with the switch from one image, video image sequence or animation to another one image, video image sequence or animation. An inter-bin transition may describe the type and rate of fade from one image to another. The inter-bin transition may be created or described through a graphical user interface (GUI) or could be described in an existing or new programming language.

An example of how a GUI might facilitate inter-bin transition is shown in FIG. 5 below. In this example the inter-bin editor at 500 allows a user to modify details about one image fading out while another optionally fades in. Other effects can occur. A selectable point is indicated at 510 where first image begins to fade. A user can drag to another point along the top line. A selectable point is indicated at 520 where first image is completely faded out. A user can drag along bottom line. A selectable point at 230 is indicated where second image is completely faded in. A user can drag along bottom line. A selectable point is indicated at 240 where second image begins to fade in. A user can drag to another point along the top line. A selectable point is indicated at 250 that can be moved independent of other point to change the intensity before and after the relative strength of the images is equal. It changes the blends from linear to non-linear. The final framing of the first image (with effects already in place) is indicated at 560; it may be zoomed in, altered, or have other visual effects contained within A main viewing window, shown at 570 displays the current view of first image changing into second. The main viewing window may be a form of media player that allows viewing of the transition as it plays. A duration bar may be provided that allows the user to slide the current time or frame in the window from the beginning of a particular segment, transition or complete MPV. The initial framing of second image (with effects) is shown at 586. The timeline is indicated at 590 from start of image to end of image and status indicator. Slider moves automatically with time to indicate the current position in the song. The user can drag slider to desired point. The shaded lower box 592 indicates the transition out of first image. The upper shaded box 594 indicates the transition into second image. The loop button for image transition is indicated at 596.

Intra-bin transitions describe visual effects associated with a specific bin. These effects include manipulation of the viewing window within a given image, video image sequence or animation. An intra-bin transition may describe the type or rate of pan and zoom of the viewing window within a given image. The transitions may describe the blending of several shots of the same subject. The transitions may also describe a The intra-bin transition may be created or described through a graphical user interface (GUI) or could be described in an existing or new programming language.

An example of how a GUI might facilitate intra-bin transition is shown in FIG. 6. In this example the intra-bin editor 600 allows for a suggestion box that offers hints, with option for more explanation and image suggestions box. This can be hidden by clicking on the x in the box. Also can the user pull up additional hint information either by clicking on box, placing mouse over box. The main viewing window at 610 shows current image when paused and the changes in image (still or video) when play is pressed. The main viewing window may be in the form of a media player that allows the user to play, stop, pause, reverse or forward their way through a transition sequence.

The initial framing of the current image (with effects already in place) indicated at 620; might be zoomed in, altered, or have other visual effects contained within. The initial frame may allow the user to select the initial condition or state before pan and zoom effects are applied. The user can select point on image, indicated at 630, on which to focus, via an optional target tool. User can click to edit or link to, end image or can remove from tool. This also enables a point to stay static during a zoom in or out. The ending framing of image is indicated at 640. As in 630, user can click to edit in a number of ways to control the final state of the pan and zoom effects.

As shown at 650 the timeline from start of image to end of image and status indicator. The slider moves automatically with time. User can drag slider to desired point within an image transition or the MPV. A loop button for image transition is shown at 660.

The zoom or pan movement in an image might occur linearly, exponentially, logarithmically, or according to another parameter. Oftentimes linear movements do not correspond well to a perception of a consistent movement. Movements of any of the parameters might automatically scale to keep perceptual consistency in mind.

As a template composer creates the template, he might utilize a tool such as the image selector tool in FIG. 9. Images can be manually or automatically inserted onto the palette in 910, where each grey box represents a different picture. These images originate from the folders, websites, or other sources described in 900. 920 represents the image from 910 currently selected for insertion into the bin that is contained by the dashed rectangle on the film strip (as described in FIG. 2 at 220). A template composer simply drags an image from the palette into the film strip at the desired location and the image now occupies the bin. The information about transitions and timing already exists with the bin, regardless of the data, though some images may have target data pre-associated with them to assist with transitions, or can be analyzed such that target data is derived automatically where a face might be. There is a resizing button at the bottom of 910 so that images can be resized to fit more images or less images on the palette, as well as sliders to move throughout the palette. Other data may be inserted onto this screen, such as hint information just above 920 that will be supplied to the user to assist in the user's selection of images.

The synchronization of the inter-bin and intra-bin image transitions with music represents fixed points in time during the duration of the song and is managed as part of the time mesh. As indicated in FIGS. 4, 5 and 6, elements of the time mesh may be shown visually as a time line that ties the image selection, image transitions, music or lyrics together. Also as shown the GUI may incorporate the use of multiple tracks to aid the user in viewing simultaneous bin, image or song related events, as illustrated in FIGS. 7 and 8. Also the selection of transition effects may be aided by the use of a handheld device that a template creator can sway like a wand or conductor's baton. This may allow the creator to more easily translate how they process the music in their brain to the visual effects that define one or more bins. Other devices may include accelerometer based devices that capture motion, such as dancing or other bodily movement and translate those motions to visual effects during template creation.

FIG. 7 provides an embodiment of intra-transition viewing with multiple overlapping bins. 700 is a suggestion box which offers hints for both bins, with option for more explanation and image suggestions box. 710 is the main viewing window, shows current view in video that mixes multiple bins and utilizes the current inter and intra transition effects. This view changes when play is pressed as movie proceeds. Synched up to slider in 5 and timeline at bottom. 720 is the initial framing of the image in bin 1 (with effects already in place); might be zoomed in, altered, or have other visual effects contained within. 722 is the end framing of the image. 730 is the initial framing of the image in bin 2 (with effects already in place); might be zoomed in, altered, or have other visual effects contained within. 732 is the end framing. 740 is the timeline from start of image to end of image and status indicator. Slider moves automatically with time. User can drag slider to desired point. 750 is the main filmstrip showing non-overlapping bins. 760 is the second filmstrip showing bins that overlap with first. There can be multiple filmstrips here, where ever bins overlap (for multiple pictures at one time that are not simply transitioning from one to next). Transitions are shown before and after to indicate when image starts and when it ends, with transitions also covering inter-slide transitions of images before and after. Dashed box refers to section shown in viewer in 710 and consistent with full time bar in 740.

Another embodiment of displaying multiple tracks for a composer or user is described in FIG. 8.

FIG. 8 provides an example of how bins may be displayed vertically to give the User or Composer an easy method to view how bins proceed over time with respect to time placement of bins and transitions. 800 shows current images occupying given bins. Bins are listed in order from top to bottom. In User Mode, clicking on a bin in this section brings up a screen to assist User in selecting a picture. In Template Composer Mode, clicking on a bin allows the Composer to edit the fields that will be visible to the user, such as keywords, effect, image selection (for multiple images to be recommended), etc. 810 is an up and down arrows allow user to scroll up or down the list of tracks for editing. 820 denotes a visually placed time segment, listed by beats or by a pre-defined time period such as seconds. 830 is a bin, placed on the horizontal axis at the time it is to begin being shown, and the transition time in and out. The shaded boxes indicate transitions. The clear boxes are where the image is full (though likely involved in an intra-bin transition). In Composer Mode, bins can be dragged to a different time, stretched, copied, or modified in other ways. Clicking on a box allows the Composer to modify the bin and its characteristics. 840 is a timeline (horizontal) of the currently shown section; the current time being played (vertical shaded bar). 850 is a track-size slider allows the tracks to be shrunk in size so that more tracks can appear, allowing the composer or user to view the full set of tracks for a video or just the current set being viewed. 860 is a timeline size slider that allows larger or shorter periods of time to be represented by the timeline. Composers require fine tuning of tracks and this method can act like a microscope, or allow the full video to be viewed on one screen.

FIG. 9 also provides an idea of how an end user might drag their images into the filmstrip to personalize a template to their tastes. Certain features would likely be disabled for the end user that are accessible to the template composer, or which may be unlocked by an end user who assumes the role of a template composer. In all the above it is assumed that the template composer and the end user are separate individuals, though they certainly could be the same individual. Additionally, any template composer could begin working from a pre-existing template, whether partially or fully complete, in order to modify the template to their liking. Any user could modify a template, whether in original form or already modified by another user, to suit their taste. For example, a friend may receive a video full of picture from a birthday party and choose to swap one picture of the birthday boy with an old picture of the birthday boy from childhood. There would likely be tracking data associated with changes over time and a possibly a repository in which the old versions and the associated data are stored. Access to different features of modification would depend on the licensing terms entered into by the various parties. For example it may be necessary to purchase a copy of the song or template in order to modify a friend's video, or even to purchase one or more copies of the song before it may be shared with others. Some of these rules might enable access to an existing copy of a song already residing on a friend's computer that would need to be referenced at run-time. The fingerprinting of the song in order to synchronize start times is of particular importance in this instance.

Elements from FIGS. 4, 5, 6, 7, 8, and 9 may be combined to display a set of data to allow composers and users to view and modify aspects of an MPV most efficiently for their specific purposes.

FIG. 10 illustrates a method to create a focal point or trajectory for the focal point during manipulation of an image during a transition effect. This tool is available to template composers and possibly end users which allows an image to have a point on the photo which stays static in it position on the screen while the photo is zoomed in or out. For example, a point between the eyes is selected as in the above illustration and while the image zooms out, the point between the eyes stays in exactly the same position on the screen. The target tool in FIG. 6 would allow these two points on the Start and End images to be locked together and move together if the user changes which part of the image is shown on the screen. For example, when locked, if the first image is moved down so that more of the head shows, the second would move in lock step to keep the point between the eyes consistent in the before and after. The second image would therefore be constrained in where it could move; its movement would require the first to also move. This tool could occur automatically, semi-automatically, or manually; the software may suggest points on the image using algorithms to detect likely targets, such as eyes or planets.

The next section provides an example of how a user might utilize the templates create by template composer. The template is used with a camera or camera equipped device to compose or capture images in real-time.

2.2 Image Composition and Capture Using Template Objects

This section provides an example of how a user might utilize the templates create by template composer with a camera or camera-equipped device such as a wireless phone or PDA, or a device capable of playing pre-recorded footage as if it were being captured live such as a PDA, portable computer, or portable gaming system, to compose or capture images in real-time. As shown in FIG. 11, the template software or software associated with a template may provide four types of functions as part of the camera image composition and capture process. The first function is that it provides 'opportunity' by allowing for one or more templates to be downloaded or shipped with the camera and providing immediate access to the template at any time. The availability of multiple templates further provides the opportunity for the user to match a given setting or event with an appropriate template to create a personalized MPV.

The second function is that the template or software associated with a template will 'assist' the user in the composition of the image such as the placement of the primary subject relative to a background or landscape or the movement of the subject for a sequence or burst of images. The third function is that the template or software associated with a template may provide instructions to the camera regarding settings, such as depth of focus or flash settings, for one or more image captures. The fourth function is that the template or software associated with a template enables the user to view existing sample images on the digital display, view and select one or more captured images for a given bin thus replacing a given template sample image and finally viewing the finished MPV on the display. The template processing unit may be in the form of a software module that resides within memory and is executed on existing digital camera electronics or it could be a separate integrated circuit component configured for template operations. The template software may be downloaded and the software associated with a template may be embedded into the camera. The software associated with a template that may be embedded into the camera will likely interpret a given template object to assist, capture, place images and view the final result. In either case, the template processing unit (constructed in software or hardware) communicates with the digital display and various camera functions via the camera system controller, FIG. 12.

The operation of the template processing and additional software to assist in camera-specific composition, enable certain modes of image capture or viewing the original template or resulting MPV is performed by software. Depending on the hardware configuration of the camera or camera equipped device, the software may use the existing processor, memory and communications devices. The template processing and additional software to assist in camera-specific composition, enable certain modes of image capture or view the original template or resulting MPV may be implemented in a special purpose semiconductor device. One such embodiment is the use of a field programmable gate array or FPGA. A field programmable gate array is an integrated circuit device that can be programmed using software in a hardware description language or logic circuit diagrams that specify the operations of the device. Another embodiment, might implement the template processing and additional software to assist in camera-specific composition, enable certain modes of image capture or viewing the original template or resulting MPV on a digital signal processing (DSP), ASIC or a mobile suitable microprocessor. The preferred embodiment is a device that is flexible enough to allow for updates to templates or additional camera specific software.

FIG. 12 shows a conventional digital camera system with optional device additions, shown with dotted lines, to enable capabilities discussed in this section. These components may be part of camera wireless phone and in that case additional phone specific components, such as communication devices, would be present. In this figure, the template processing and additional software to assist in camera-specific composition, enable certain modes of image capture or view the original template or resulting MPV are implemented as a FPGA or programmable DSP device shown in the upper center of the figure. Also shown are the Bluetooth module which allows the user to hear the song or audio direction from the camera via wireless communication to one or more headsets. Similarly, an MP3 player is shown for direct connection to wired headphones or alternatively a built-in speaker. The loading of the templates may be done through the digital I/O module, the storage controller or through an additional wireless communication chip which is not shown in FIG. 12 but would be available on a camera equipped phone for example. The visual communication to the user related to viewing of one or more templates can be done with the camera's existing memory storage, system control and display modules. The visual communication to the user related to composing images for a specific bin can be done with the camera's existing memory storage, system control and display modules. The operational communication related to one or more image captures can be done with the camera's existing system control electronics. The following section describe the software functionality and methods related to the template-related opportunity, assistance, capture and viewing of images.

As described in Section 2.1, each template is associated with a particular song and has fixed bins for which a user will choose or capture images. The preferred embodiment is that the song is available in the camera so that the user can hear the song while composing and capturing the images and that it may provide a richer experience. However in other cases the song may not be available for download or included with the template and the invention includes the use of the template without the song as well. The synchronization of the sample images and the music is done during template creation so the replacement of the sample images with new images for a given bin can still occur. Other embodiments include the use of wireless headphones that allow the user to hear the music while shooting or for a speaker so that a subject may also hear the music. The camera could be part of a kit that includes an earpiece and a speaker that communicates via wireless or wired transmission from the camera.

The resulting MPV can be sent from the camera to another person. There are multiple ways to do this. One method is for User A to email the completed MPV to another person, Recipient B, who receives the MPV or a link to a server where the MPV may be downloaded. In the case where the template is associated with a commercially available song, User A may choose to purchase the song for the Recipient B and their MPV is downloaded with the associated song. User A may choose not to purchase the song and Recipient B receives a URL link to download the MPV and purchase the song. User A may choose not to purchase the song and Recipient B receives the MPV and is prompted to purchase the song when they try to play it. User A may choose not to purchase the song and Recipient B receives the MPV and already owns the song which resides on a device that is used to view the MPV. The invention includes the various combinations of transmitting MPV and the associated songs or the various combinations of sending links to locations where MPVs and songs may be downloaded.

FIG. 13 provides an embodiment of the process for an end user utilizing a camera to create an MPV. In this case the camera will take photos though other similar embodiments would include video, animations, text, or other visual materials. The user starts by choosing a song, mood, or theme 2000 for which to create a video. The user can view templates 2010 built on that song, mood, or theme to identify which template will be selected for modification. There may be multiple templates made by a variety of template composers that are all built upon an identical song. In 2020 the user selects the template to use, possibly including the purchase of the song and template at this stage. In 2030 the user views the instructions contained within the template about characteristics of the images to capture or find for placement into a bin, a series of bins (most likely in the form of a list). In 2040 the user begins to look at the first bin which requires an image, and in 2050 instructions and lyrics about what the image should contain are included. Additionally, while in this bin the corresponding section of the song may play so that the user can feel mood of the music and hear lyrics. In 2060, a user takes one or more multiple pictures which are stored into the currently selected bin. One of these images will occupy the bin and that image will be selected in 2070 by the user. It may default to the last picture taken in the bin. Certain bins may require multiple images to be included and these could be selected from the bin. In 2080 the user proceeds to the next bin either automatically after capturing an image, selecting an image, or manually indicating to proceed. After the last bin is filled, 2090 allows the user to view the full movie with their images. After viewing, in 2100 the user has the option to share, upload, or gift the video. In 2110 the user has the opportunity to further edit the video on a PC or other mobile device such as a digital camera, digital frame, mobile handset, or other electronic device that offers a user the ability to download the video and its parts and provide further commands for replacing images in various bins.

There may be additional steps in FIG. 13 and the listed steps may be skipped or performed in a different order. Other various optional steps are included in the dashed boxes in the right column in 2011 through 2081. For example in 2011 a user may view multiple templates for a given song at the same time in order to see the differences as they occur. One template video could be on the left and a second on the right. 2021 allows for purchase of a song or template at a given point in the process, which could also occur in 2041 when gifting to another person. 2051 allows a user to move between bins as they desire, allowing images to be captured out of order as the user desires. 2061 gives the user the opportunity to view all or a segment of the video at a given time, or could allow a given bin to loop through the various images in the bin so the user can see how they look. 2062 allows many images to be referenced to a bin for easy reference at a later point in time even though they are not the image being used in the MPV in the bin slot. The real-time reference to a bin is an improvement over the current requirement that a user taking many photos at a given time would have to perform the binning assignment to a set of photos later on as they decide which image to select, without the benefit of music and requiring the user to remember what goes where, particularly for photos taken out of sequence of the bins. 2062 helps organize the assignment of the images taken in 2061 and avoid confusion later. 2071 allows the user to find photos previously taken and place them into the selected bin, or allows the user to locate and select other symbolic images that may have been downloaded with the template for particular bins. The user may also choose an image from several that appear from a search on keywords relating to the bin or from previous images taken that reside in other folders. 2081 allows annotation of images or blank bins, or allows basic editing of selected images such as red-eye reduction, targeting which area to focus on in the image as it moves, or resizing the viewable part of an image.

2.2.1 Opportunity

The opportunity function described in FIG. 11 relates to items 2000, 2010, 2011, 2020, and 2021 in FIG. 13. One embodiment is indicated in FIG. 12 as an system where the functions are already integrated either in hardware, software, or a combination. In one case the camera or similar device is sold to consumers pre-loaded with the ability view and select templates as well as create an MPV after selection. In another case a user download software that allows for template viewing and modification onto a more generalized device such as a camera-phone that is capable of downloading software applications and already contains the necessary hardware to store, view, and utilize templates. There are also embodiments that utilize pre-existing functionality in the device, including pre-loaded software for the creation of MPVs, that utilize download features to further update software that resides locally on the device for the creation of MPVs or addition of templates.

In one embodiment the downloaded software may contain templates or portions of templates for the user to choose from locally on the device as in 2010. While not required, there would likely be navigational utilities to help in the selection of templates, guiding a user through the selection of moods, themes, or songs. As an example, a user may key in a mood such as happiness or melancholy. The device would then search for templates that are resident on the device or resident on a server to which it can communicate to select templates that have been identified with that particular mood. Templates, portions of the templates, or descriptive information about the templates, such as a song the template is based on, would then be delivered to the user. Different methods for ranking and ordering the templates would be employed, such as which is most popular by purchase in the last week, which has been rated highest by viewers, or which are associated with template composers that gained reputations for creating quality templates. The user would then receive an ordered list of templates organized one or several of these ranking methods that provide available templates to choose from. The user may then view these templates as in 2010 to see what they like best. While viewing a specific template, the software may provide other guides such as a suggestion that users who viewed particular templates ended up purchasing other templates, possibly including the percent of users who purchased each after viewing the current template.

A user might also choose to select a theme such as Christmas or Halloween. The user might undergo a similar process as indicated in mood, being provided a list of templates ranked by a variety of methods. The user might also utilize both a theme and a mood to select the templates to view. In one example a user selects "Halloween" and then "funny", providing a list of templates that are closest to these parameters. Other templates that might be related to "Halloween" and "classic" but not related to "funny" would not be shown. Other criteria for any search might be that a template's cost is free, is within a certain price range, or is freely distributable to others. The same might apply to a template's music which might be free, within a certain price range, or be freely distributable. Other options may be available such as the ability to include advertising within an MPV in order to offset the cost of the template or music, or templates which are free if the user provides rights to freely distribute or showcase the finished MPV to a software provider. The intent of the navigational utilities is to provide an easy method for users to select a mood, theme, or song that fits their desired criteria as quickly as possible and that provides the most utility to the user, be it popularity, quality, or other criteria.

Another method for search might be by song. The software may provide users an list of templates, organized by any of a number of criteria, such as the highest-rated templates based on a particular song or artist, the most current Billboard chart toppers, the highest ranked in any of a number of musical genres such as Country Music or R&B, the most recently purchased templates, templates that have had the finished MPV most distributed, songs that have the most templates, templates ranked as highest quality by one or more groups, templates that are most relevant to purchases already made by the user or to a user's demographic as defined by the user, by the software provider, or by a third party such as a DJ in a genre or subscribed to by the user. Keywords are also obvious selection criteria for templates, and might include song names, musical artist names, musical album names, lyrics associated with the template, or synonyms of any of these. The software might provide results based on a match of keywords and other ranking criteria, such as a blend of the keyword and popularity.

Such a search selection of templates could occur directly on the device. Certain templates which are most likely to be purchased may be preloaded into the software and available for a user immediately, possibly with a purchase required. Other search results would likely come from a connection to a user's computer or to the Internet. The device user could browse the available templates or browse template information provided from the Internet, which would be delivered to the device as search criteria were provided to a server containing template information via the Internet. The user might then download selected templates for purchase or for previewing directly onto the device.

A computer may also be used for template selection. Software for template selection (and possibly MPV creation or template editing) might contain many preloaded templates ready for viewing or use. The user might view these on a PC and select which they would like to place onto the camera with the intent of creating an MPV. A computer might also allow for the downloading to a related device. For example a user might download an MPV or a template to a pre-registered device such as a camera or a digital frame that has another means of connecting to the Internet such as through wireless telephone networks, through wireless connections to a local area network, or where a device is connected, wired or wirelessly, to another computer accessible by the Internet such as that for a family member located elsewhere.

In many cases, a user will be required to log into an account prior to accessing or purchasing templates. The account might contain credits or value that a user has access to for the purchase of music, a template, or both. It might also contain MPVs that were purchased or created by the user, or gifted to the user by another, either as a rental or perpetually licensed gift, possibly with ability to view future variations or updates to a given MPV template.

Another embodiment for MPV creation allows the user to view pre-created video or image footage and select parts of the footage to insert into a selected template. In this instance, a user might download both a template and one or more hours of footage which they would watch. Such a device need not contain image capture since the raw image footage would already be provided. The template might offer suggestions about what images or video to place into the bins. The images or video might be further editable, such as cropping, rotating, or changing color. The user would then be able to create the MPV based on these images. High resolution images may reside on a server and be accessible during the MPV creation process or after a required purchase. In such a case the MPV creation software would note the time of a particular image in the video being watched and be able to reference the higher resolution image from this time data. The MPV could then be created on the device locally or on a server and delivered to the device or to the user's account for further distribution. The footage viewed by a user may or may not be related to particular template.

2.2.2 Assist

The assist function described in FIG. 11 relates to items 2030, 2040, 2041, 2050, 2051, and 2070 in FIG. 13. The goal of the assist function is to improve the imagery captured and selected by users by providing users with educational information before and during the image capture and selection process. Information fed into the assist function is generally provided or chosen by the template composer. Some examples of features provided in the assist function are illustrated in FIGS. 11, 12, and 13. FIG. 14 provides an illustration of a user utilizing a camera to shoot images in real-time for insertion into a pre-created template. 2200 shows instruction to user on hints of what to shoot (optional). 2210 shows the live viewing pane of what camera lens sees and will capture when the picture or video is taken. 2220 shows lyrics (optional). 2230 shows a film strip of images for previous, current, and next bins. Current images taken will be placed into the currently selected bin and the user may open that bin at a later time to choose from among those photos. The most recent image taken would be selected and dropped into the bin, such that the previous bin has the last image taken in the last bin shoot, or an image selected by the user for that bin. 2440 shows the current image to replace (either supplied symbolic image or most recent image selected by User). From this screen, the user could choose to pull up the Camera-based Image Selector screen in order to select a pre-existing image from elsewhere to place into the bin as the selected image. The user can also move to the next bin by pressing a "next" button or pressing on the bin to the right of the current main window in 2240. The preferred method is for the template to include an actual version of the song to enhance the visual-audio synchronization in the template. One embodiment allows the user to hear the song as the images are composed or captured. However, there are embodiments where camera based template may not include the actual song at the moment of image capture but is downloaded or assembled into the MPV at a later date.

FIG. 15 provides an illustration of a user utilizing a camera to shoot images in real-time for insertion into a pre-created template where a background is included in part of the template and guidance is therefore required during image capture to ensure the captured image automatically fits within the template in an aesthetically pleasing manner. 2400 lists instructions for the User, containing hints of what to shoot (optional). 2410 is the inserted background for this bin that is in video. 2420 is a live viewing pane of what camera lens sees and what will replace the personalized section over the background. Only that part of the image will be visible in the video so only that part shows in the viewfinder. 2430 shows the lyrics (optional). 2440 shows an example image with background and the example personalized section overlaid. This image is supplied with the template or a previously selected image. When a viewer looks into their viewfinder, they will only see the part that shows over the background, which is 2420. The rest is effectively blocked out, even though a full image might be captured or a blended image might be captured in camera memory.

FIG. 16 illustrates a screen being utilized by a User who has already created images and wants to place them into an MPV. The User may have gone through the process of capturing images with a live camera and placed them into bins, may have images that came with the template, may have searched for additional images using a search engine, or may have accessed images previously taken by the User. This tool allows the User to easily view lots of images and select the proper image for the bin, then moving on to the next bin and repeating the process as needed. The selection process could occur on a portable device, such as a camera, to augment parts of an MPV that the user desires to modify with pre-existing pictures.

2500 shows folders that contain images (still or video). Users can add more folders, including websites that contain images. 2502 displays a visual list of images from the folders listed in 2500. Images can be dragged into the Time-synched Energy Template to replace an existing image. Images can be grouped by "Your Images Taken" or by pre-loaded "Suggested Images" that are supplied with the template or taken from a web search based on keywords of the image. 2506 displays instruction for User of what type of image to select. 2508 shows lyrics for User of current bin. 2510 shows currently selected picture from 2502. 2508 displays lyrics for User. 2514 shows the timeline of images, including at least prior, current, and next. 2516 shows the current image occupying the current bin. It is consistent with 2510. 2518 shows the transition into current image occupying bin. 2520 shows controls for moving forward/backward in time or to next/prior bin. 2522 shows a view-size slider which allows images in 2514 to be made larger or smaller. 2524 shows a volume control slider. 2526 shows a menu button that brings up additional options including selecting images to show, moving bins, saving progress, changing screens, turning on or off optional features (e.g. lyrics) etc.

The assist function may provide additional features to those in FIGS. 14, 15, and 16. Features, including some of those mentioned in the earlier Figures, include the following.

- A list which can be viewed on a display, where each item refers to a bin and includes keywords. The list can be viewed on the device display, emailed, viewed on a PC, or viewed in another way.
- The ability to view a library of images pre-selected for bins by template composers, images placed into bins of MPVs previously made by users, images from local or online libraries, images from online communities, images from linked friends in online communities, or images that have been processed and possess visual characteristics, any of which might or might not be tagged with keywords consistent with the template composer's instructed keywords.
- The ability to view a list of images pre-selected by a template composer or third party which has instructions about the positive characteristics about the image, including what a user should try to do in composing an image for a particular bin.
- The ability to view multiple images in a bin in an MPV at the same time, or to view images designated for a single bin in sequence in a loop, possibly included a prior and/or next image.
- The auto-detection of characteristics within an image, such as a face that might fit into a pre-defined area of a background image
- Instructions for a user to take multiple images that could be automatically cropped or super-imposed, possibly in a sequence over time. Images might be taken in certain portion of the viewfinder, or be full-sized images which are resized and placed into the prescribed position.
- Instructions that can be toggled on or off to guide a user in the placement and sizing of a subject.
- Lyrics that can be toggled on or off for a particular bin
- Automatic selection of the point of focus on an image
- Manual selection of the point of focus of an image using instructions on what to place the focus on, such as a building, a persons eyes, a river, or other object
- Automatic selection of one image for each bin from a pool of images marked as belonging to a particular bin to be placed in the bin for the creation of an MPV, or the ability to watch an MPV that selects from a designated pool of images for each bin.
- A service whereby an image can be uploaded and commented on, edited, or modified by a third party, providing the user with guidance about the quality of the image and what could improve the image.
- A service whereby the images taken by a user, possibly many images that may or may not be designated for specific bins, would be transmitted to professionals or third-parties, possibly be edited or cut, and placed into bins to form an MPV for the user.
- Any combination of the above.

2.2.3 Capture

The capture function described in FIG. 11 relates to items 2060, 2061, 2062, 2081 in FIG. 13. The goal of capture is to improve the imagery captured and selected by users through mechanical or digital means. Features for capture might include the following:

The capture of multiple photos in sequence such that they might be displayed later in sequence to show a progression of movement.

The capture of multiple images at different focus levels at a rapid pace such that moving between images gives the appearance of movement and/or distance.

The capture of multiple images simultaneously that allows effects processing to create three dimensional views or movements.

The capture and auto-placement of images into a designated bin

The capture of images blended with a background such as that in FIG. 12 at 2410 or an overlay image (shapes, text, or photo-elements) that occurs on in front of the image so that the resulting image or video is the blended image.

The capture of images assigned to a bin and paired with a background image where the captured image is kept intact The capture of multiple images that are automatically composed in a specific format. For example, three poses are desired for an image. The camera-display allows the viewer for the first image to occupy only the left third of the screen. The second image capture occurs in the middle third, and the third to the third. These images could then be automatically combined into a single image. Such a process could also utilize the full view screen and simply reduce the images.

The use of box outlines to ensure only the necessary part of an image is captured for a particular image The ability to capture multiple images where one image is a zoom in of another image, such that the zoom from the larger to smaller or smaller to larger occurs automatically by using algorithms to identify the corresponding smaller portion of the larger picture that maps to the zoomed in image. For example, a user might take a zoom in picture of their friend and zoom out to include the view of a mountain behind them. Only the larger image would be used but the zoom would be calculated to start at the portion that includes only the friend as in the first image.

The ability to capture multiple images which are stitched together for a wide panning movement, vertically and/or horizontally.

The ability to modify pixels at the edge to move more rapidly off screen to give the appearance of moving quickly.

Any combination of the above.

FIG. 17 shows an example display on a camera, camera-phone, or other portable device. 2600 is a box with an icon that allows the user to switch into edit mode versus image capture mode. Once pressed, the user would be able to view the existing images as an MPV rather than be in a capture mode tied to the particular bin being shot or seeing what images the device is trying to capture. In this mode, a user could press on an image and slide the finger to move it around or could use a pinching motion of two fingers on the screen to zoom in on a picture. Sliding two fingers away from each other would zoom out. 2602 would shrink the image and present a number of new options to the user, as shown in FIG. 18. 2604 would allow another function, such as information or upload items in this MPV to the web or download items from the web now for this MPV. There is a play button on the lower left that allows the MPV to proceed. It shows a pause icon while playing and a play icon while paused to toggle between the two. The lower right displays a button for rewinding to the beginning. A user could slide a finger on the filmstrip to scroll through different bins, or could press one to automatically move to that point. Immediately above the filmstrip is a slider for the whole song, indicating how much of the entire MPV is shown by the width ratio of the grey box versus the entire length of the scroll bar. Lyrics appear in this example and are optional as indicated by the user.

FIG. 18 shows a menu of items along the left and right that appear after the button in 2602 is pressed. 2602 in FIG. 17 then become a button that will return to the screen in FIG. 17, removing the menus. Items 2630, 2632, 2634, 2636, 2638, and 2640 are functions used in editing, such as image selection, zoom, pan, rotate, blend, target, and loop. If pressed, the user is able to edit the image in that aspect. For example, if the target button is pressed, a target appears and the user can drag the target to the desired location. 2644, 2646, 2648, 2650, and 2652 perform functions similarly. Certain functions might utilize a slider or option set to choose from, such as zoom. FIG. 18 could also have a slider appearing in place of 2630 to 2640 to allow the user to modify the aspect accordingly. Pressing the plus button at 2630 above might raise the value, or simply sliding a finger from where the current level is to the desired level might accomplish the same.

One edit item might be edge warp, where a user needs a regular image to be stretched to achieve an HD width. For example, if the image in FIG. 18 needed to be stretched to be wider, the user could drag a rectangle around the humans in order not to stretch the humans; the result would be stretching portions of the image that appear fine when stretched, while avoiding strange looking results. Pixels near the edge might also be stretched more that others since it will be noticed less. This technique could be used in template creation as well.

Another edit item, for either captured or currently viewed footage, would be for the edges to stretch as the user is filming. For example, as a user walks with the video camera, the edges would appear to be moving faster, giving a sense of peripheral viewing like a human. The net effect is that the user viewing the footage feels that the video is moving a lot faster than if no effect of the edges were in place. A specific example is when a camera is filming out the front of a car which does not appear to be moving quickly. It the edges moved rapidly off screen in a non-linear way, the car would appear to be moving much more quickly.

2.2.4 View

The view function described in FIG. 11 relates to items 2090 in FIG. 13. Users can view MPVs with sample images, view their own with final images, view with different images being placed into a single bin to help decide which to select, or viewed semi-randomly where images are placed into the MPVs according to some selection criteria such as bins containing multiple images or such as images in any available library matching tags on the bin. Viewing is also possible on devices that do not contain image capture, such as digital picture frames, or through output to another device by sending a digital or analog output signal such as connecting the camera to a TV for viewing the MPV. Viewing may occur at variable rates of volume (including no volume), occur at variable rates of speed for faster or slower playback, utilize standard navigational icons including play, pause, go to end, go to beginning, fast forward, rewind, and varying degrees of fast forward and rewind. Users may also watch an MPV in a mode where the bins can be modified as they are watched, such as changing a point of focus or amount of zoom, or use accelerometers, gyroscopes, or other physical movement sensors to modify the MPV as it is being viewed, such as pulsing to a physical movement or panning based on turning the device. In some of the instances, images. higher resolution images, or a rendered video would need to be downloaded into the viewing device so that the MPV could be assembled or viewed.

2.2.5 Share

Users may share an MPV in complete or partially complete form. One method is to email the MPV file and possibly associated files, as a movie file or collection of MPV-related files that would be accessed during playback for construction of the video. Another method is to upload MPV files to a server where they can be accessed by others, possibly through an account they have set up on the server. If license fees are required, users may have already paid for certain users to be able to view the video, or they may allow others to purchase necessary rights to view the video. Purchase fees might allow for ability to modify part or all of the MPV. An MPV on a server may also be rendered and shared as a non-modifiable movie or MPV file rather than modifiable MPV files. Users might also use other transfer techniques such as Bluetooth technology for wireless transmission or a USB cable to share from one device to another, or be allowed to burn files onto a CD so they can be transferred to another user.

FIG. 19 describes a likely scenario for a user has just completed personalizing an MPV with his own images. At this point a user may desire to place a title and share the MPV with friends. 2800 shows an area where User can change title of the video. 2810 shows an area where User can select email addresses of others to share video with. 2820 shows an area where user can upload video to backend service and User can access from other computer or device There may be various other embodiments not described here that achieve the spirit of the invention to accomplish these desired tasks with the combined objectives of simplicity of use and maximum intensity of effect. The novel features and advantages of the invention are described in the next section. and capture key elements of a larger set of embodiments that achieve the spirit of the invention.

2.3 Applications of Mpv Beyond Video Usage

One application of MPVs beyond video creation and viewing is for video games. The user would either be able to take images in real time and receive a score for the sequence or individual images. Alternatively the user might be required to size and place a rectangle inside existing pictures in order to cut the images, after which the user would receive a corresponding score based on how well the image was cut. Many variations could play on this such as determining the rotation or the point of focus. Scoring an image could take place automatically or could rely on a service of live humans that rates the modified image or the chosen effect. Educational opportunities could arise from this as well, such that the game is marketed as an educational utility to help improve the image capture of aspiring photographers or children. Some of these may come with preloaded footage as described earlier such that the final images are demonstrated to the user as a collection of preferred images. In other games, there could be specific points where the user needs to cut a song according to some criteria they are judged against, such as certain beats or accents. Users might be required to move the device according to the effect that is happening such as down or up or rotated based on movement of an image.

Another videogame example is a treasure hunt, where children are directed to find and capture particular objects. Instructions might occur by audio instructions or written instructions, or use images that possess the desired quality the child is searching for such as "red" or "three" or "building" or "Mickey Mouse". The child would then take photos of the items as each bin requests, and at the end of the exercise the video would be created automatically using the items captured, synched to some type of pre-defined music. Images of the child might be overlaid with the items found. Items might also need to fit within certain areas on a screen to ease in the video editing, and the direction or display screen would assist the user.

Videobooks are another application. Videobooks can either physically display several images from video sequences in a print form similar to a comic book, or may digitally offer video sequences similar to an advanced feature digital frame capable of displaying sound and music. For example, a user might be able to take screen shots every 1 second or take series of shots in close together in a video sequence and then compile with others so that a story from the book emerges in print form. There might be 20, 50, 100, or more photos in the sequence, likely arranged by bin. Lyrics or comments might be included for a given bin. Images would likely contain effects that had been performed in the MPV so that a series of images, for example, zooms in or pans in similarly to the MPV.

The portable device may also be used in the semi-automated creation of templates. Any type of sensors, such as accelerometers, could be used to capture human movement as a song occurs. That data could then be interpreted to provide cuts, pans, zooms, blends, and other effects. Input devices used to collect this data might be external to the device but plug into the device with a cable or use a wireless communication technology such as Bluetooth to send information to the device.

We claim the exclusive rights and privileged use of:

1. A method for the use of a software-based template to create a video synchronized to a specific piece of music, comprising:

providing a selection of one or more songs to a user;

in response to the user selecting a song, providing a selection of templates associated with the song, the templates comprising bins for inserting images, the bins are mapped to particular portions of the song such that the contents of the bins are displayed during the particular portions of the song to which the respective bin is mapped, the templates also include instructions;

receiving from the user a choice of template;

displaying the chosen template using software embedded in a device that includes an image sensor and a display;

providing to the user the instructions for the chosen template, the instructions indicate how to capture one or more images using the image sensor;

receiving one or more images from the image sensor;

placing the received images into at least one of the one or more bins of the chosen template;

creating a video comprising the one or more images placed into at least one of the one or more bins of the chosen template; and presenting the video, the one or more images comprising the video are displayed along with the song.

2. The method of claim 1, further comprising the steps of:

submitting one or more images from the bins of the chosen template through an online service to one or more third parties;

receiving through the online service feedback from the third parties regarding one or more qualities of the submitted images; and presenting the received feedback to the user.

3. The method of claim 1, wherein:

the chosen template is configured to employ a set of machine instructions embedded in one or more digital devices connected to the device that includes an image sensor and a display, the template retrieves the machine instructions from the set via one or more reference calls to the one or more digital devices.

4. The method of claim 1, further comprising the step of: according to instructions from the user, adjusting the duration for which the contents of one or more of the bins of the chosen template are displayed in the video.

5. The method of claim 1, further comprising the step of: placing the images in the bins according to instructions from the user.

6. The method of claim 1, further comprising the step of: providing visual indicators shown on the display of the device, wherein the visual indicators provide instructions specifying transition effects for the user to include in the video.

7. The method of claim 1, further comprising the step of: providing instructions to a user regarding composing one or more of the images by informing the user as to a preferred placement of a subject of one or more of the images relative to other parts of the images.

8. The method of claim 1, further comprising the step of: providing visual indicators shown on the display of the device while the user is preparing to capture an image, the visual indicators indicating which parts of the image will be visible when displayed during presentation of the video if the image were inserted into one or more of the bins of the chosen template.

9. The method invention of claim 1, further comprising the step of:
playing one or more parts of the song while the user prepares to capture one or more images via the image sensor.

10. The method of claim 1, further comprising the step of: issuing commands to device including the image sensor and the display to capture multiple images.

11. The method of claim 10, wherein:
multiple images are captured at one or more different settings.

12. The method of claim 11, wherein:
the settings include one or more depth-of-focus settings.

13. The method of claim 10, further comprising the step of: performing effects processing on the multiple images, the effects processing creates a three-dimensional image.

14. The method of claim 10, further comprising the step of: performing effects processing on the multiple images, the effects processing is configured to convey motion in the video.

15. The method of claim 1, further comprising the steps of: designating one or more of the bins of the chosen template to receive one or more images once the images are captured by the image sensor; and
placing one or more images captured by the image sensor into the designated bins.

16. The method of claim 1, further comprising the step of: stitching one or more of the images together for a panning movement effect.

17. The method of claim 1, further comprising the step of: storing the video in the form of a software object.

18. The method of claim 1, wherein:
the device that includes the image sensor and the display is equipped with one or more sensors different from the image sensor, the chosen template is further configured to convert one or more readings from the one or more sensors different from the image sensor into visual effects in the video.

19. The method of claim 18, wherein:
the sensors are remotely connected to the device.

20. The method of claim 1, further comprising the step of: using digital stretching and cutting techniques on a temporal duration of the song and a temporal duration of the display of contents of the bins of the chosen template in the video to match the temporal duration of the song to the temporal duration of the display of contents of the bins of the chosen template in the video.

21. The method of claim 1, further comprising the steps of: instructing the user to capture a particular subject in an image; and
providing the user a score based on one or more qualities of the image captured.

22. The method of claim 1, further comprising the step of: converting the video into a videobook.

23. The method of claim 15, further comprising the step of: combining one or more the captured images to a background image in the bin of the chosen template that receives the captured images.

24. The method of claim 15, further comprising the step of: composing the captured images into a format specified by the chosen template.

25. The method of claim 14, further comprising the step of: modifying pixels at edges of the images to move more rapidly off a screen of the display during presentation of the video.

26. An apparatus that can host a software-based template to create a video synchronized to a piece of music, comprising:
an image sensor;
a display interface;
a data storage system configured to store image files, audio files, and software; and
one or more processors in communication with the image sensors, the display interface, and the data storage system, the one or more processors provide a choice of one or more songs from the data storage system to a user through the display interface, in response to the user selecting a song the one or more processors provide to the user through the display interface a selection of templates associated with the song from the data storage system, the templates comprising bins for inserting images, the bins are associated with particular portions of the song such that the contents of the bins are displayed during the particular portions of the song to which the respective bin is associated, the templates also including instructions, the one or more processors receive from the user a choice of template, the one or more processors display the chosen template through the display interface, the one or more processors provide to the user through the display interface the instructions included for the chosen template, the instructions indicate how to capture one or more images using the image sensor, the one or more processors receive one or more images from the image sensor, the one or more processors place one or more of the images into at least one of the one or more bins of the chosen template, the one or more processors create a video comprising the one or more images placed into at least one of the one or more bins.

27. The apparatus of claim 26, wherein the one or more processors also perform the step of:
providing visual indicators through the display interface while the user is preparing to capture an image, the visual indicators indicating which parts of the image will be visible when inserted into one or more of the bins of the template.

28. The apparatus of claim 26, wherein the one or more processors also perform the step of:

according to instructions from the user, adjusting the duration for which the contents of one or more of the bins of the chosen template are displayed in the video.

29. One or more non-transitory memories having embodied thereon software which when executed by one or more processors causes the one or more processors to perform a method to create a video synchronized to a piece of music, the method comprising:

providing a selection of one or more songs to a user;

in response to the user selecting a song, providing a selection of templates associated with the song, the templates comprising bins for inserting images, the bins are associated to particular portions of the song such that the contents of the bins are displayed during the particular portions of the song to which the respective bin is associated, the templates also include instructions;

receiving from the user a choice of template;

displaying the chosen template using software embedded in a device that includes an image sensor and a display;

providing to the user the instructions for the chosen template, the instructions indicate how to capture one or more images using the image sensor;

receiving one or more images from the image sensor;

placing the received images into at least one of the one or more bins of the chosen template; and creating a video comprising the one or more images placed into at least one of the one or more bins of the chosen template.

30. The one or more non-transitory memories according to claim 29, wherein the method further comprises:

providing visual indicators shown on the display of the device while the user is preparing to capture an image, the visual indicators indicating which parts of the image will be visible when displayed during presentation of the video if the image were inserted into one or more of the bins of the chosen template.

31. The one or more non-transitory memories according to claim 30, wherein the method further comprises:

according to instructions from the user, adjusting the duration for which the contents of one or more of the bins of the chosen template are displayed in the video.

* * * * *